US012586595B2

(12) United States Patent
Fuchs et al.

(10) Patent No.: US 12,586,595 B2

(45) Date of Patent: Mar. 24, 2026

(54) APPARATUS, METHOD AND COMPUTER PROGRAM FOR ENCODING AN AUDIO SIGNAL OR FOR DECODING AN ENCODED AUDIO SCENE

(71) Applicant: Fraunhofer-Gesellschaft zur Foerderung der angewandten Forschung e.V., Munich (DE)

(72) Inventors: Guillaume Fuchs, Erlangen (DE); Archit Tamarapu, Erlangen (DE); Andrea Eichenseer, Erlangen (DE); Srikanth Korse, Erlangen (DE); Stefan Doehla, Erlangen (DE); Markus Multrus, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 363 days.

(21) Appl. No.: 18/160,894

(22) Filed: Jan. 27, 2023

(65) Prior Publication Data

US 2023/0306975 A1 Sep. 28, 2023

Related U.S. Application Data

(63) Continuation of application No. PCT/EP2021/064576, filed on May 31, 2021.

(30) Foreign Application Priority Data

Jul. 30, 2020 (EP) .................................... 20188707

(51) Int. Cl.

*G10L 19/032* (2013.01)
*G10L 19/012* (2013.01)
(Continued)

(52) U.S. Cl.

CPC .......... *G10L 19/032* (2013.01); *G10L 19/012* (2013.01); *G10L 25/78* (2013.01); *G10L 25/93* (2013.01)

(58) Field of Classification Search

CPC ..... G10L 19/032; G10L 19/012; G10L 25/78; G10L 25/93; G10L 19/008; G10L 19/12; G10L 19/167; G10L 19/173
(Continued)

(56) References Cited

U.S. PATENT DOCUMENTS

| | | |
|---|---|---|
| 5,812,965 A | 9/1998 | Massaloux |
| 7,693,708 B2 | 4/2010 | Gournay et al. |

(Continued)

FOREIGN PATENT DOCUMENTS

| | | |
|---|---|---|
| CN | 103180899 A | 6/2013 |
| CN | 103534754 A | 1/2014 |

(Continued)

OTHER PUBLICATIONS

Lombard, Anthony, et al., "Frequency-domain Comfort Noise Generation for Discontinuous Transmission in EVS", 2015 IEEE International Conference on Acoustics, Speech and Signal Processing (ICASSP), Brisbane, OLD, 2015, pp. 5893-5897, pp. 5893-5897.

(Continued)

*Primary Examiner* — Duc Nguyen
*Assistant Examiner* — Chimezie Ezeriwe Bekee
(74) *Attorney, Agent, or Firm* — Perkins Coie LLP; Michael A. Glenn

(57) ABSTRACT

There are disclosed an apparatus for generating an encoded audio scene, and an apparatus for decoding and/or processing an encoded audio scene; as well as related methods and non-transitory storage units storing instructions which, when executed by a processor, cause the processor to perform a related method. An apparatus for processing an encoded (Continued)

audio scene may include, in a first frame, a first soundfield parameter representation and an encoded audio signal, wherein a second frame is an inactive frame, the apparatus including: an activity detector for detecting that the second frame is the inactive frame; a synthetic signal synthesizer for synthesizing a synthetic audio signal for the second frame using the parametric description for the second frame; an audio decoder for decoding the encoded audio signal for the first frame; and a spatial renderer for spatially rendering the audio signal for the first frame using the first soundfield parameter representation and using the synthetic audio signal for the second frame, or a transcoder for generating a meta data assisted output format including the audio signal for the first frame, the first soundfield parameter representation for the first frame, the synthetic audio signal for the second frame, and a second soundfield parameter representation for the second frame.

26 Claims, 12 Drawing Sheets

(51) Int. Cl.
*G10L 25/78* (2013.01)
*G10L 25/93* (2013.01)

(58) Field of Classification Search
USPC .................... 700/94; 704/210, 214, 215, 230
See application file for complete search history.

(56) References Cited

U.S. PATENT DOCUMENTS

| | | | |
|---|---|---|---|
| 9,514,757 | B2 | 12/2016 | Oshikiri et al. |
| 10,224,040 | B2 | 3/2019 | Huang et al. |
| 10,224,046 | B2 | 3/2019 | Dickins et al. |
| 2011/0305344 | A1 | 12/2011 | Sole et al. |
| 2012/0130713 | A1* | 5/2012 | Shin ........................ G10L 25/78 704/E15.001 |
| 2013/0223633 | A1 | 8/2013 | Oshikiri et al. |
| 2013/0332175 | A1 | 12/2013 | Setiawan et al. |
| 2015/0213809 | A1 | 7/2015 | Peters et al. |
| 2017/0032798 | A1 | 2/2017 | Peters et al. |
| 2017/0032799 | A1 | 2/2017 | Peters et al. |
| 2017/0215020 | A1 | 7/2017 | Robinson et al. |
| 2018/0005641 | A1 | 1/2018 | Krueger et al. |
| 2018/0342252 | A1 | 11/2018 | Fuchs et al. |
| 2019/0189134 | A1 | 6/2019 | Li et al. |
| 2019/0221219 | A1 | 7/2019 | Wang |
| 2019/0385622 | A1 | 12/2019 | Kim et al. |
| 2020/0175998 | A1 | 6/2020 | Li et al. |

FOREIGN PATENT DOCUMENTS

| | | | | |
|---|---|---|---|---|
| CN | 103680509 | A | | 3/2014 |
| CN | 104318927 | A | | 1/2015 |
| CN | 104871242 | A | | 8/2015 |
| CN | 107742521 | A | | 2/2018 |
| CN | 108885879 | A | | 11/2018 |
| CN | 109448741 | A | | 3/2019 |
| CN | 110556120 | A | | 12/2019 |
| EP | 0768770 | A1 | | 4/1997 |
| EP | 0843301 | A2 | | 5/1998 |
| EP | 3511934 | A1 | | 7/2019 |
| JP | H113099 | A | * | 1/1999 |
| JP | 5933965 | B2 | | 5/2016 |
| JP | 2019533189 | A | | 11/2019 |
| RU | 2533437 | C2 | | 11/2014 |
| RU | 2617553 | C2 | | 4/2017 |
| RU | 2016130323 | A | | 3/2018 |
| RU | 2689427 | C2 | | 5/2019 |
| TW | 201909658 | A | | 3/2019 |
| TW | 201911293 | A | | 3/2019 |
| WO | 0241302 | A1 | | 5/2002 |
| WO | 2012066727 | A1 | | 5/2012 |
| WO | 2013006338 | A2 | | 1/2013 |
| WO | 2014040763 | A1 | | 3/2014 |
| WO | 2014096279 | A1 | | 6/2014 |
| WO | 2014143582 | A1 | | 9/2014 |
| WO | 2015122809 | A1 | | 8/2015 |
| WO | 2019193149 | A1 | | 10/2019 |
| WO | 2019193156 | A1 | | 10/2019 |
| WO | 2020002448 | A1 | | 1/2020 |
| WO | 2020104726 | A1 | | 5/2020 |

OTHER PUBLICATIONS

Pulkki, V, et al., "Directional audio coding—perception-based reproduction of spatial sound", International Workshop on the Principles and Application on Spatial Hearing, Nov. 2009, Zao; Miyagi, Japan, 4 pp.

Pulkki, Ville, "Virtual sound source positioning using vector base amplitude panning", J. Audio Eng. Soc., 45(6):456-466, Jun. 1997, pp. 456-466.

Vilkamo, Juha, et al., "Optimized Covariance Domain Framework for Time—Frequency Processing of Spatial Audio", Journal of the Audio Engineering Society. 61., 9 pp.

McGrath, D "Immersive Audio Coding for Virtual Reality Using a Metadata-assisted Extension of the 3GPP EVS Codec", ICASSP 2019 -2019 IEEE International Conference on Acoustics, Speech and Signal Processing (ICASSP), IEEE, May 2019, pp. 730-734.

"Codec for Enhanced Voice Services (EVS); Comfort Noise Generation (CNG) Aspects, Release 13", 3GPP TS 26.449 V13.0.0 (Jan. 2016), Jan. 2016, 10 pp.

"Codec for Enhanced Voice Services (EVS); Discontinuous Transmission (DTX), Release 13", 3GPP TS 26.450 V13.0.0 (Jan. 2016), Jan. 2016, 10 pp.

"Digital cellular telecommunications system (Phase 2+)", 3GPP TS 26.194 V13.0.0 (Jan. 2016), Universal Mobile Telecommunications System (UMTS); LTE; Speech codec processing functions; Adaptive Multi-Rate—Wideband (AMR-WB) speech codec; Voice Activity Detector (VAD), Release 13, Jan. 2016, 17 pp.

Ahonen, Jukka, et al., "Diffuseness estimation using temporal variation of intensity vectors", Workshop on Applications of Signal Processing to Audio and Acoustics WASPM, Mohonk Mountain House, New Paltz, 2009., 4 pp.

Hirvonen, Toni, et al., "Perceptual compression methods for metadata in Directional Audio Coding applied to audiovisual teleconference", AES 126th Convention May 7-10, 2009, Munich, Germany, 8 pp.

Laitinen, Mikko-Ville, et al., "Converting 5.1 audio recordings to B-format for directional audio coding reproduction", 2011 IEEE International Conference on Acoustics, Speech and Signal Processing (ICASSP), Prague, 2011, pp. 61-64, doi: 10.1109/ICASSP.2011.5946328, pp. 61-64.

Wang, Zhe, "Linear Prediction Based Comfort Noise Generation in the Evs Codec", IEEE International Conference on Acoustics, Speech and Signal Processing (ICASSP), 2015, pp. 5904-5907.

Zhang, Ling, "Research on wideband and variable rate speech coder based on SILK", Database of Chinese excellent master's thesis, 2020, 77 pages.

* cited by examiner

APPARATUS, METHOD AND COMPUTER PROGRAM FOR ENCODING AN AUDIO SIGNAL OR FOR DECODING AN ENCODED AUDIO SCENE

CROSS-REFERENCES TO RELATED APPLICATIONS

This application is a continuation of copending International Application No. PCT/EP2021/064576, filed May 31, 2021, which is incorporated herein by reference in its entirety, and additionally claims priority from European Application No. EP 20 188 707.2, filed Jul. 30, 2020, which is incorporated herein by reference in its entirety.

BACKGROUND OF THE INVENTION

This document refers, inter alia, to an apparatus for generating an encoded audio scene, and to an apparatus for decoding and/or processing an encoded audio scene. The document also refers to related methods and non-transitory storage units storing instructions which, when executed by a processor, cause the processor to perform a related method.

This document discusses methods on discontinuous transmission mode (DTX) and comfort noise generation (CNG) for audio scenes for which the spatial image was parametrically coded by the directional audio coding (DirAC) paradigm or transmitted in Metadata-Assisted Spatial Audio (MASA) format.

Embodiments relate to Discontinuous Transmission of Parametrically Coded Spatial Audio such as a DTX mode for DirAC and MASA.

Embodiments of the present invention are about efficiently transmitting and rendering conversational speech e.g. captured with soundfield microphones. The thus captured audio signal is in general called three-dimension (3D) audio, since sound events can be localized in the three dimensional space, which reinforces the immersivity and increases both intelligibility and user experience.

Transmitting an audio scene e.g. in three dimensions requires handling multiple channels which usually engenders a large amount of data to transmit. For example Directional Audio Coding (DirAC) technique [1] can be used for reducing the large original data rate. DirAC is considered an efficient approach for analyzing the audio scene and representing it parametrically. It is perceptually motivated and represents the sound field with the help of a direction of arrival (DOA) and diffuseness measured per frequency band. It is built upon the assumption that at one time instant and for one critical band, the spatial resolution of the auditory system is limited to decoding one cue for direction and another for inter-aural coherence. The spatial sound is then reproduced in frequency domain by cross-fading two streams: a non-directional diffuse stream and a directional non-diffuse stream.

Moreover, in a typical conversation, each speaker is silent for about sixty percent of the time. By distinguishing frames of the audio signal that contain speech ("active frames") from frames containing only background noise or silence ("inactive frames"), speech coders can save significant data rate. Inactive frames are typically perceived as carrying little or no information, and speech coders are usually configured to reduce their bit-rate for such frames, or even transmitting no information. In such case, coders run in so-called Discontinuous Transmission (DTX) mode, which is an efficient way to drastically reduce the transmission rate of a communication codec in the absence of voice input. In this mode, most frames that are determined to consist of background noise only are dropped from transmission and replaced by some Comfort Noise Generation (CNG) in the decoder. For these frames, a very low-rate parametric representation of the signal is conveyed by Silence Insertion Descriptor (SID) frames sent regularly but not at every frame. This allows the CNG in the decoder to produce an artificial noise resembling the actual background noise.

Embodiments of the present invention relate to a DTX system and especially an SID and CNG for 3D audio scenes, captured for example by a soundfield microphone and which may be coded parametrically by a coding scheme based on the DirAC paradigm and alike. Present invention allows drastic reduction of the bit-rate demand for transmitting conversational immersive speech.

CONVENTIONAL TECHNOLOGY

[1] V. Pulkki, M-V. Laitinen, J. Vilkamo, J. Ahonen, T. Lokki, and T. Pihlajamäki, "Directional audio coding-perception-based reproduction of spatial sound", International Workshop on the Principles and Application on Spatial Hearing, November 2009, Zao; Miyagi, Japan.

[2] 3GPP TS 26.194; Voice Activity Detector (VAD);-3GPP technical specification Retrieved on 2009 Jun. 17.

[3] 3GPP TS 26.449, "Codec for Enhanced Voice Services (EVS); Comfort Noise Generation (CNG) Aspects".

[4] 3GPP TS 26.450, "Codec for Enhanced Voice Services (EVS); Discontinuous Transmission (DTX)"

[5] A. Lombard, S. Wilde, E. Ravelli, S. Dohla, G. Fuchs and M. Dietz, "Frequency-domain Comfort Noise Generation for Discontinuous Transmission in EVS," 2015 *IEEE International Conference on Acoustics, Speech and Signal Processing* (*ICASSP*), Brisbane, Q L D, 2015, pp. 5893-5897, doi: 10.1109/ICASSP.2015.7179102.

[6] V. Pulkki, "Virtual source positioning using vector base amplitude panning", J. Audio Eng. Soc., 45(6): 456-466, June 1997.

[7] J. Ahonen and V. Pulkki, "Diffuseness estimation using temporal variation of intensity vectors", in Workshop on Applications of Signal Processing to Audio and Acoustics WASPAA, Mohonk Mountain House, New Paltz, 2009.

[8] T. Hirvonen, J. Ahonen, and V. Pulkki, "Perceptual compression methods for metadata in Directional Audio Coding applied to audiovisual teleconference", AES 126th Convention 2009 May 7-10, Munich, Germany.

[9] Vilkamo, Juha & Bäckström, Tom & Kuntz, Achim. (2013). Optimized Covariance Domain Framework for Time-Frequency Processing of Spatial Audio. Journal of the Audio Engineering Society. 61.

M. Laitinen and V. Pulkki, "Converting 5.1 audio recordings to B-format for directional audio coding reproduction," 2011 IEEE International Conference on Acoustics, Speech and Signal Processing (ICASSP), Prague, 2011, pp. 61-64, doi: 10.1109/ICASSP.2011.5946328.

SUMMARY

An embodiment may have an apparatus for generating an encoded audio scene from an audio signal comprising a first frame and a second frame, comprising: a soundfield parameter generator for determining a first soundfield parameter representation for the first frame from the audio signal in the first frame and a second soundfield parameter representation for the second frame from the audio signal in the second frame; and an activity detector for analyzing the audio signal to determine, depending on the audio signal, that the first frame is an active frame and the second frame is an inactive frame, wherein the soundfield parameter generator is configured to determine, from the second frame of the audio signal, individual sound source(s) and to determine, for each sound source, a parametric description for the second frame, wherein the soundfield parameter generator is configured to decompose the second frame into frequency bin(s), each frequency bin representing an individual sound source of the individual sound source(s), and to determine, for each frequency bin, at least one inactive spatial parameter as the second soundfield parameter representation for the second frame, the at least one inactive spatial parameter comprising a direction parameter, a direction of arrival parameter, a diffuseness parameter, or an energy ratio parameter, the apparatus further comprising: an audio signal encoder for generating an encoded audio signal, the encoded audio signal providing an encoded audio signal for the first frame being the active frame and the parametric description for the second frame being the inactive frame; and an encoded signal former for composing the encoded audio scene by bringing together the first soundfield parameter representation for the first frame, the second soundfield parameter representation for the second frame, the encoded audio signal for the first frame, and the parametric description for the second frame.

Another embodiment may have a method of generating an encoded audio scene from an audio signal comprising a first frame and a second frame, comprising: determining a first soundfield parameter representation for the first frame from the audio signal in the first frame and a second soundfield parameter representation for the second frame from the audio signal in the second frame; and analyzing the audio signal to determine, depending on the audio signal, that the first frame is an active frame and the second frame is an inactive frame, wherein determining the first soundfield parameter representation comprises determining, from the second frame of the audio signal, for each sound source, a parametric description for the second frame, wherein determining the first soundfield parameter representation comprises decomposing the second frame into frequency bin(s), each frequency bin representing an individual sound source, and determining, for each frequency bin, at least one inactive spatial parameter as the second soundfield parameter representation for the second frame, the at least one inactive spatial parameter comprising a direction parameter, a direction of arrival parameter, a diffuseness parameter, or an energy ratio parameter, the method further comprising: generating an encoded audio signal, the encoded audio signal providing an encoded audio signal for the first frame being the active frame and the parametric description for the second frame being the inactive frame; and composing the encoded audio scene by bringing together the first soundfield parameter representation for the first frame, the second soundfield parameter representation for the second frame, the encoded audio signal for the first frame, and the parametric description for the second frame.

Another embodiment may have an apparatus for processing an encoded audio scene comprising, in a first frame, a first soundfield parameter representation and an encoded audio signal, wherein a second frame is an inactive frame, the apparatus comprising: an activity detector for detecting that the second frame is the inactive frame; a synthetic signal synthesizer for synthesizing a synthetic audio signal for the second frame using a parametric description for the second frame; an audio decoder for decoding the encoded audio signal for the first frame; and a transcoder for generating a meta data assisted output format comprising the audio signal for the first frame, the first soundfield parameter representation for the first frame, the synthetic audio signal for the second frame, and a second soundfield parameter representation for the second frame.

Another embodiment may have an apparatus for processing an encoded audio scene comprising, in a first frame, a first soundfield parameter representation and an encoded audio signal, and in a second frame an inactive frame, the second frame being decomposed frequency bin(s), and, for each frequency bin, at least one inactive spatial parameter being determined as second soundfield parameter representation for the second frame, the at least one inactive spatial parameter comprising a direction parameter, a direction of arrival parameter, a diffuseness parameter, or an energy ratio parameter, the apparatus comprising: an activity detector for detecting that the second frame is the inactive frame; a synthetic signal synthesizer for synthesizing a synthetic audio signal for the second frame using a parametric description for the second frame; an audio decoder for decoding the encoded audio signal for the first frame; and a spatial renderer for spatially rendering the audio signal for the first frame using the first soundfield parameter representation and using the synthetic audio signal and the second soundfield parameter representation for the second frame, wherein the synthetic signal generator is configured to generate one or more transport channels for the second frame as the synthetic audio signal, and wherein the spatial renderer is configured to spatially render the one or more transport channels for the second frame.

Another embodiment may have a method of processing an encoded audio scene comprising, in a first frame, a first soundfield parameter representation and an encoded audio signal, and, in a second frame, an inactive frame, the encoded audio scene comprising one or more transport channels for the first frame, the second frame being decomposed into frequency bin(s), and, for each frequency bin, at least one inactive spatial parameter being determined as second soundfield parameter representation for the second frame, the method comprising: detecting that the second frame is the inactive frame; synthesizing a synthetic audio signal for the second frame using a parametric description for the second frame; decoding the encoded audio signal for the first frame; and spatially rendering the audio signal for the first frame using the first soundfield parameter representation and using the synthetic audio signal for the second frame and the synthetic audio signal for the second frame, the method further comprising generating one or more transport channels for the second frame as the synthetic audio signal, and spatially rendering the one or more transport channels for the second frame, the method further comprising deriving one or more second soundfield parameters for the second frame, wherein the parameter processor is configured to store the first soundfield parameter representation for the first frame and to synthesize one or more second soundfield parameters for the second frame using the stored first soundfield parameter representation for the first frame, wherein the second frame follows the first frame in time.

Another embodiment may have an encoded audio scene comprising: a first soundfield parameter representation for a first frame; a second soundfield parameter representation for a second frame; an encoded audio signal for the first frame; and a parametric description for the second frame, decomposed into frequency bin(s), wherein it is determined, for each frequency bin, at least one inactive spatial parameter as the second soundfield parameter representation for the second frame, the at least one inactive spatial parameter comprising a direction parameter, a direction of arrival parameter, a diffuseness parameter, or an energy ratio parameter.

Another embodiment may have a non-transitory digital storage medium having a computer program stored thereon to perform the method of generating an encoded audio scene from an audio signal comprising a first frame and a second frame, comprising: determining a first soundfield parameter representation for the first frame from the audio signal in the first frame and a second soundfield parameter representation for the second frame from the audio signal in the second frame; and analyzing the audio signal to determine, depending on the audio signal, that the first frame is an active frame and the second frame is an inactive frame, wherein determining the first soundfield parameter representation comprises determining, from the second frame of the audio signal, for each sound source, a parametric description for the second frame, wherein determining the first soundfield parameter representation comprises decomposing the second frame into frequency bin(s), each frequency bin representing an individual sound source, and determining, for each frequency bin, at least one inactive spatial parameter as the second soundfield parameter representation for the second frame, the at least one inactive spatial parameter comprising a direction parameter, a direction of arrival parameter, a diffuseness parameter, or an energy ratio parameter, the method further comprising: generating an encoded audio signal, the encoded audio signal providing an encoded audio signal for the first frame being the active frame and the parametric description for the second frame being the inactive frame; and composing the encoded audio scene by bringing together the first soundfield parameter representation for the first frame, the second soundfield parameter representation for the second frame, the encoded audio signal for the first frame, and the parametric description for the second frame, when said computer program is run by a computer.

Another embodiment may have a non-transitory digital storage medium having a computer program stored thereon to perform the method of processing an encoded audio scene comprising, in a first frame, a first soundfield parameter representation and an encoded audio signal, and, in a second frame, an inactive frame, the encoded audio scene comprising one or more transport channels for the first frame, the second frame being decomposed into frequency bin(s), and, for each frequency bin, at least one inactive spatial parameter being determined as second soundfield parameter representation for the second frame, the method comprising: detecting that the second frame is the inactive frame; synthesizing a synthetic audio signal for the second frame using a parametric description for the second frame; decoding the encoded audio signal for the first frame; and spatially rendering the audio signal for the first frame using the first soundfield parameter representation and using the synthetic audio signal for the second frame and the synthetic audio signal for the second frame, the method further comprising generating one or more transport channels for the second frame as the synthetic audio signal, and spatially rendering the one or more transport channels for the second frame, the method further comprising deriving one or more second soundfield parameters for the second frame, wherein the parameter processor is configured to store the first soundfield parameter representation for the first frame and to synthesize one or more second soundfield parameters for the second frame using the stored first soundfield parameter representation for the first frame, wherein the second frame follows the first frame in time, when said computer program is run by a computer.

In accordance to an aspect, there is provided an apparatus for generating an encoded audio scene from an audio signal having a first frame and a second frame, comprising:

- a soundfield parameter generator for determining a first soundfield parameter representation for the first frame from the audio signal in the first frame and a second soundfield parameter representation for the second frame from the audio signal in the second frame;
- an activity detector for analyzing the audio signal to determine, depending on the audio signal, that the first frame is an active frame and the second frame is an inactive frame;
- an audio signal encoder for generating an encoded audio signal for the first frame being the active frame and for generating a parametric description for the second frame being the inactive frame; and
- an encoded signal former for composing the encoded audio scene by bringing together the first soundfield parameter representation for the first frame, the second soundfield parameter representation for the second frame, the encoded audio signal for the first frame, and the parametric description for the second frame.

The soundfield parameter generator may be configured to generate the first soundfield parameter representation or the second soundfield parameter representation so that the first soundfield parameter representation or the second soundfield parameter representation comprises a parameter indicating a characteristic of the audio signal with respect to a listener position.

The first or the second soundfield parameter representation may comprise one or more direction parameters indicating a direction of sound with respect to a listener position in the first frame, or one or more diffuseness parameters indicating a portion a diffuse sound with respect to a direct sound in the first frame, or one or more energy ratio parameters indicating an energy ratio of a direct sound and a diffuse sound in the first frame, or an inter-channel/surround coherence parameter in the first frame.

The soundfield parameter generator may be configured to determine, from the first frame or the second frame of the audio signal, a plurality of individual sound sources and to determine, for each sound source, a parametric description.

The soundfield generator may be configured to decompose the first frame or the second frame into a plurality of frequency bins, each frequency bin representing an individual sound source, and to determine, for each frequency bin, at least one soundfield parameter, the soundfield parameter exemplarily comprising a direction parameter, a direction of arrival parameter, a diffuseness parameter, an energy ratio parameter or any parameter representing a characteristic of the soundfield represented by the first frame of the audio signal with respect to a listener position.

The audio signal for the first frame and the second frame may comprise an input format having a plurality of components representing a soundfield with respect to a listener, wherein the soundfield parameter generator is configured to calculate one or more transport channels for the first frame and the second frame, for example using a downmix of the plurality of components, and to analyze the input format to determine the first parameter representation related to the one or more transport channels, or wherein the soundfield parameter generator is configured to calculate one or more transport channels, for example using a downmix of the plurality of components, and wherein the activity detector is configured to analyze the one or more transport channels derived from the audio signal in the second frame.

The audio signal for the first frame or the second frame may comprise an input format having, for each frame of the first and second frames, one or more transport channels and metadata associated with each frame, wherein the soundfield parameter generator is configured to read the metadata from the first frame and the second frame and to use or process the metadata for the first frame as the first soundfield parameter representation and to process the metadata of the second frame to obtain the second soundfield parameter representation, wherein the processing to obtain the second soundfield parameter representation is such that an amount of information units required for the transmission of the metadata for the second frame is reduced with respect to an amount required before the processing.

The soundfield parameter generator may be configured to process the metadata for the second frame to reduce a number of information items in the metadata or to resample the information items in the metadata to a lower resolution, such as a time resolution or a frequency resolution, or to requantize the information units of the metadata for the second frame to a coarser representation with respect to a situation before requantization.

The audio signal encoder may be configured to determine a silence information description for the inactive frame as the parametric description, wherein the silence information description exemplarily comprises an amplitude-related information, such as an energy, a power or a loudness for the second frame, and a shaping information, such as a spectral shaping information, or an amplitude-related information for the second frame, such as an energy, a power, or a loudness, and linear prediction coding, LPC, parameters for the second frame, or scale parameters for the second frame with a varying associated frequency resolution so that different scale parameters refer to frequency bands with different widths.

The audio signal encoder may be configured to encode, for the first frame, the audio signal using a time domain or frequency domain encoding mode, the encoded audio signal comprising, for example, encoded time domain samples, encoded spectral domain samples, encoded LPC domain samples and side information obtained from components of the audio signal or obtained from one or more transport channels derived from the components of the audio signal, for example, by a downmixing operation.

The audio signal may comprise an input format being a first order Ambisonics format, a higher order Ambisonics format, a multi-channel format associated with a given loudspeaker setup, such as 5.1 or 7.1 or 7.1+4, or one or more audio channels representing one or several different audio objects localized in a space as indicated by information included in associated metadata, or an input format being a metadata associated spatial audio representation, wherein the soundfield parameter generator is configured for determining the first soundfield parameter representation and the second soundfield representation so that the parameters represent a soundfield with respect to a defined listener position, or wherein the audio signal comprises a microphone signal as picked up by real microphone or a virtual microphone or a synthetically created microphone signal e.g. being in a first order Ambisonics format, or a higher order Ambisonics format.

The activity detector may be configured for detecting an inactivity phase over the second frame and one or more frames following the second frame, and wherein the audio signal encoder is configured to generate a further parametric description for an inactive frame only for a further third frame that is separated, with respect to a time sequence of frames, from the second frame by at least one frame, and wherein the soundfield parameter generator is configured for determining a further soundfield parameter representation only for a frame, for which the audio signal encoder has determined a parametric description, or wherein the activity detector is configured for determining an inactive phase comprising the second frame and eight frames following the second frame, and wherein the audio signal encoder is configured for generating a parametric description for an inactive frame only at every eighth frame, and wherein the soundfield parameter generator is configured for generating a soundfield parameter representation for each eighth inactive frame, or wherein the soundfield parameter generator is configured for generating a soundfield parameter representation for each inactive frame even when the audio signal encoder does not generate a parametric description for an inactive frame, or wherein the soundfield parameter generator is configured for determining a parameter representation with a higher frame rate than the audio signal encoder generates the parametric description for one or more inactive frames.

The soundfield parameter generator may be configured for determining the second soundfield parameter representation for the second frame using spatial parameters for one or more directions in frequency bands and associated energy ratios in frequency bands corresponding to a ratio of one directional component over a total energy, or to determine a diffuseness parameter indicating a ratio of diffuse sound or direct sound, or to determine a direction information using a coarser quantization scheme compared to a quantization in the first frame, or using an averaging of a direction over time or frequency for obtaining a coarser time or frequency resolution, or to determine a soundfield parameter representation for one or more inactive frames with the same frequency resolution as in the first soundfield parameter representation for an active frame, and with a time occurrence that is lower than the time occurrence for active frames with respect to a direction information in the soundfield parameter representation for the inactive frame, or to determine the second soundfield parameter representation having a diffuseness parameter, where the diffuseness parameter is transmitted with the same time or frequency resolution as for active frames, but with a coarser quantization, or to quantize a diffuseness parameter for the second soundfield representation with a first number of bits, and wherein only a second number of bits of each quantization index is transmitted, the second number of bits being smaller than the first number of bits, or to determine, for the second soundfield parameter representation, an inter-channel coherence if the audio signal has input channels corresponding to channels positioned in a spatial domain or inter-channel level differences if the audio signal has input channels corresponding to channels positioned in the spatial domain, or to determine a surround coherence being defined as a ratio of diffuse energy being coherent in a soundfield represented by the audio signal.

In accordance to an aspect, there is provided an apparatus for processing an encoded audio scene comprising, in a first frame, a first soundfield parameter representation and an encoded audio signal, wherein a second frame is an inactive frame, the apparatus comprising:

an activity detector for detecting that the second frame is the inactive frame;

a synthetic signal synthesizer for synthesizing a synthetic audio signal for the second frame using the parametric description for the second frame;

an audio decoder for decoding the encoded audio signal for the first frame; and a spatial renderer for spatially rendering the audio signal for the first frame using the first soundfield parameter representation and using the synthetic audio signal for the second frame, or a transcoder for generating a meta data assisted output format comprising the audio signal for the first frame, the first soundfield parameter representation for the first frame, the synthetic audio signal for the second frame, and a second soundfield parameter representation for the second frame.

The encoded audio scene may comprise, for the second frame, a second soundfield parameter description, and wherein the apparatus comprises a soundfield parameter processor for deriving one or more soundfield parameters from the second soundfield parameter representation, and wherein the spatial renderer is configured to use, for the rendering of the synthetic audio signal for the second frame, the one or more soundfield parameters for the second frame.

The apparatus may comprise a parameter processor for deriving one or more soundfield parameters for the second frame, wherein the parameter processor is configured to store the soundfield parameter representation for the first frame and to synthesize one or more soundfield parameters for the second frame using the stored first soundfield parameter representation for the first frame, wherein the second frame follows the first frame in time, or wherein the parameter processor is configured to store one or more soundfield parameter representations for several frames occurring in time before the second frame or occurring in time subsequent to the second frame to extrapolate or interpolate using the at least two soundfield parameter representations of the one or more soundfield parameter representations for several frames to determine the one or more soundfield parameters for the second frame, and wherein the spatial renderer is configured to use, for the rendering of the synthetic audio signal for the second frame, the one or more soundfield parameters for the second frame.

The parameter processor may be configured to perform a dithering with directions included in the at least two soundfield parameter representations occurring in time before or after the second frame, when extrapolating or interpolating to determine the one or more soundfield parameters for the second frame.

The encoded audio scene may comprise one or more transport channels for the first frame, wherein the synthetic signal generator is configured to generate one or more transport channels for the second frame as the synthetic audio signal, and wherein the spatial renderer is configured to spatially render the one or more transport channels for the second frame.

The synthetic signal generator may be configured to generate, for the second frame, a plurality of synthetic component audio signals for individual components related to an audio output format of the spatial renderer as the synthetic audio signal.

The synthetic signal generator may be configured to generate, at least for each one of a subset of at least two individual components related to the audio output format, an individual synthetic component audio signal, wherein a first individual synthetic component audio signal is decorrelated from a second individual synthetic component audio signal, and wherein the spatial renderer is configured to render a component of the audio output format using a combination of the first individual synthetic component audio signal and the second individual synthetic component audio signal.

The spatial renderer may be configured to apply a covariance method.

The spatial renderer may be configured to not use any decorrelator processing or to control a decorrelator processing so that only an amount of decorrelated signals generated by the decorrelator processing as indicated by the covariance method is used in generating a component of the audio output format.

The synthetic signal generator is a comfort noise generator.

The synthetic signal generator may comprise a noise generator and the first individual synthetic component audio signal is generated by a first sampling of the noise generator and the second individual synthetic component audio signal is generated by a second sampling of the noise generator, wherein the second sampling is different from the first sampling.

The noise generator may comprise a noise table, and wherein the first individual synthetic component audio signal is generated by taking a first portion of the noise table, and wherein the second individual synthetic component audio signal is generated by taking a second portion of the noise table, wherein the second portion of the noise table is different from the first portion of the noise table, or wherein the noise generator comprises a pseudo noise generator, and wherein the first individual synthetic component audio signal is generated by using a first seed for the pseudo noise generator, and wherein the second individual synthetic component audio signal is generated using a second seed for the pseudo noise generator.

The encoded audio scene may comprise, for the first frame, two or more transport channels, and wherein the synthetic signal generator comprises a noise generator and is configured to generate, using the parametric description for the second frame, a first transport channel by sampling the noise generator and a second transport channel by sampling the noise generator, wherein the first and the second transport channels as determined by sampling the noise generator are weighted using the same parametric description for the second frame.

The spatial renderer may be configured to operate in a first mode for the first frame using a mixing of a direct signal and a diffuse signal generated by a decorrelator from the direct signal under a control of the first soundfield parameter representation, and in a second mode for the second frame using a mixing of a first synthetic component signal and the second synthetic component signal, wherein the first and the second synthetic component signals are generated by the synthetic signal synthesizer by different realizations of a noise process or a pseudo noise process.

The spatial renderer may be configured to control the mixing in the second mode by a diffuseness parameter, an energy distribution parameter, or a coherence parameter derived for the second frame by a parameter processor.

The synthetic signal generator may be configured to generate a synthetic audio signal for the first frame using the parametric description for the second frame, and wherein the spatial renderer is configured to perform a weighted combination of the audio signal for the first frame and the synthetic audio signal for the first frame before or after the spatial rendering, wherein, in the weighted combination, an intensity of the synthetic audio signal for the first frame is reduced with respect to an intensity of the synthetic audio signal for the second frame.

A parameter processor may be configured to determine, for the second inactive frame, a surround coherence being defined as a ratio of diffuse energy being coherent in a soundfield represented by the second frame, wherein the spatial renderer is configured for redistributing an energy between direct and diffuse signals in the second frame based on the sound coherence, wherein an energy of sound surround coherent components is removed from the diffuse energy to be redistributed to directional components, and wherein the directional components are panned in a reproduction space.

The apparatus may comprise an output interface for converting an audio output format generated by the spatial renderer into a transcoded output format such as an output format comprising a number of output channels dedicated for loudspeakers to be placed at predefined positions, or a transcoded output format comprising FOA or HOA data, or wherein, instead of the spatial renderer, the transcoder is provided for generating the meta data assisted output format comprising the audio signal for the first frame, the first soundfield parameters for the first frame and the synthetic audio signal for the second frame and a second soundfield parameter representation for the second frame.

The activity detector may be configured for detecting that the second frame is the inactive frame.

In accordance to an aspect, there is provided a method of generating an encoded audio scene from an audio signal having a first frame and a second frame, comprising:

determining a first soundfield parameter representation for the first frame from the audio signal in the first frame and a second soundfield parameter representation for the second frame from the audio signal in the second frame;

analyzing the audio signal to determine, depending on the audio signal, that the first frame is an active frame and the second frame is an inactive frame;

generating an encoded audio signal for the first frame being the active frame and generating a parametric description for the second frame being the inactive frame; and composing the encoded audio scene by bringing together the first soundfield parameter representation for the first frame, the second soundfield parameter representation for the second frame, the encoded audio signal for the first frame, and the parametric description for the second frame.

In accordance to an aspect, there is provided a method of processing an encoded audio scene comprising, in a first frame, a first soundfield parameter representation and an encoded audio signal, wherein a second frame is an inactive frame, the method comprising:

detecting that the second frame is the inactive frame and for providing a parametric description for the second frame;

synthesizing a synthetic audio signal for the second frame using the parametric description for the second frame;

decoding the encoded audio signal for the first frame; and spatially rendering the audio signal for the first frame using the first soundfield parameter representation and using the synthetic audio signal for the second frame, or generating a meta data assisted output format comprising the audio signal for the first frame, the first soundfield parameter representation for the first frame, the synthetic audio signal for the second frame, and a second soundfield parameter representation for the second frame.

The method may comprise providing a parametric description for the second frame.

In accordance to an aspect, there is provided an encoded audio scene comprising:

a first soundfield parameter representation for a first frame;

a second soundfield parameter representation for a second frame;

an encoded audio signal for the first frame; and a parametric description for the second frame.

In accordance to an aspect, there is provided a computer program for performing, when running on a computer or processor, a method of above or below.

BRIEF DESCRIPTION OF THE DRAWINGS

Embodiments of the present invention will be detailed subsequently referring to the appended drawings, in which:

FIG. 5 shows an example of a component according to an example.

DETAILED DESCRIPTION OF THE INVENTION

At first, some discussion of known paradigms (DTX, DirAC, MASA, etc.) is provided, with the description of techniques some of which may be, at least in some cases, implemented in examples of the invention.

DTX

Comfort noise generators are usually used in Discontinuous Transmission (DTX) of speech. In such a mode the speech is first classified in active and inactive frames by a Voice Activity Detector (VAD). An example of a VAD can be found in [2]. Based on the VAD result, only the active speech frames are coded and transmitted at the nominal bit-rate. During long pauses, where only the background noise is present, the bit-rate is lowered or zeroed and the background noise is coded episodically and parametrically. The average bit-rate is then significantly reduced. The noise is generated during the inactive frames at the decoder side by a Comfort Noise Generator (CNG). For example the speech coders AMR-WB [2] and 3GPP EVS [3, 4] both have the possibility to be run in DTX mode. An example of an efficient CNG is given in [5].

Embodiments of the present invention extend this principle in a way that it applies the same principle to immersive conversational speech with spatial localization of the sound events.

DirAC

DirAC is a perceptually motivated reproduction of spatial sound. It is assumed that at one time instant and for one critical band, the spatial resolution of auditory system is limited to decoding one cue for direction and another for inter-aural coherence.

Figure 1A:
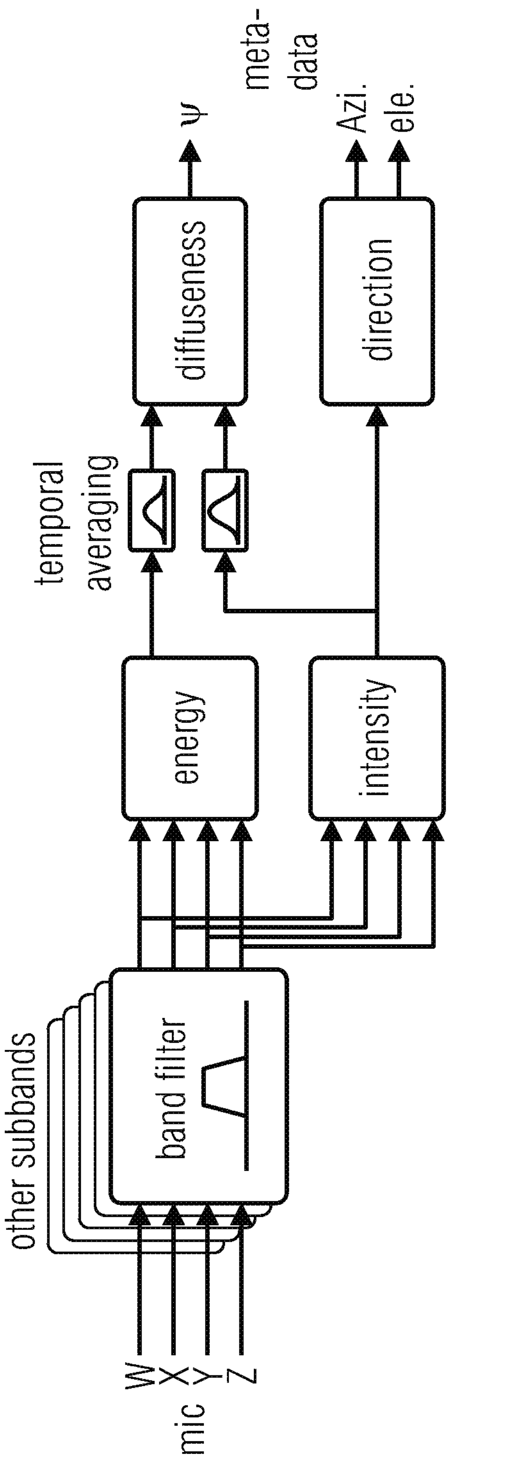
FIGS. 1*a* and 1*b* shows an example according to the conventional technology which can be used for analysis and synthesis according to examples.
Figure 1B:
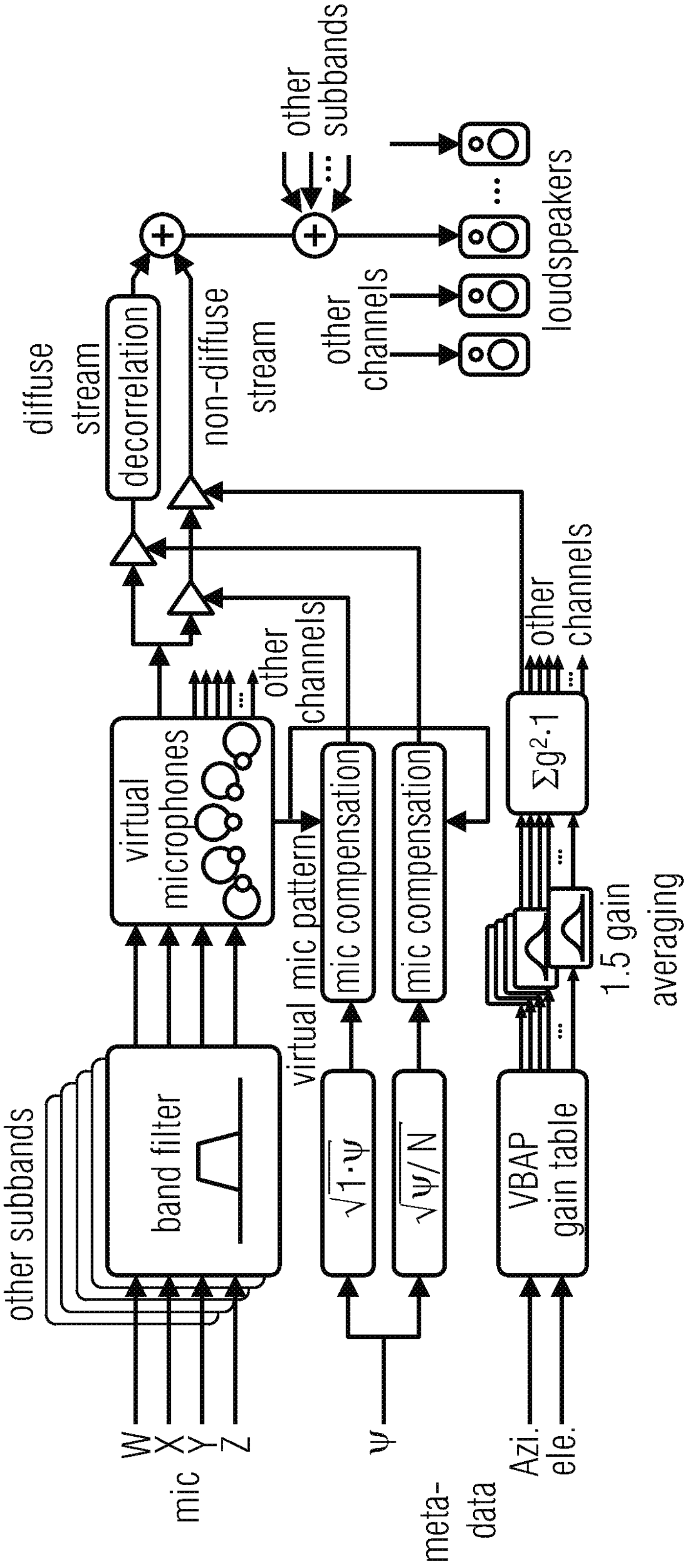

Based on these assumptions, DirAC represents the spatial sound in one frequency band by cross-fading two streams: a non-directional diffuse stream and a directional non-diffuse stream. The DirAC processing is performed in two phases: the analysis and the synthesis as pictured in FIG. 1 (FIG. 1*a* showing a synthesis, FIG. 1*b* showing an analysis).

In the DirAC analysis stage, a first-order coincident microphone in B-format is considered as input and the diffuseness and direction of arrival of the sound is analyzed in frequency domain.

In the DirAC synthesis stage, sound is divided into two streams, the non-diffuse stream and the diffuse stream. The non-diffuse stream is reproduced as point sources using amplitude panning, which can be done by using vector base amplitude panning (VBAP) [6]. The diffuse stream is in general responsible for the sensation of envelopment and is produced by conveying to the loudspeakers mutually decorrelated signals.

The DirAC parameters, also called spatial metadata or DirAC metadata in the following, consist of tuples of diffuseness and direction. Direction can be represented in spherical coordinate by two angles, the azimuth and the elevation, while the diffuseness may be scalar factor between 0 and 1.

Some works have been done for reducing the size of metadata for enabling the DirAC paradigm to be used for spatial audio coding and in teleconference scenarios [8].

To the best of the inventors' knowledge, no DTX system has ever been built or proposed around a parametric spatial audio codec and even less based on the DirAC paradigm. This is the subject of embodiments of the present invention.

MASA

Metadata assisted Spatial Audio (MASA) is spatial audio format derived from the DirAC principle, which can be directly computed from the raw microphone signals and conveyed to an audio codec without the need to go through an intermediate format like Ambisonics. A parameter set, which may consist of a direction parameter e.g. in frequency bands and/or an energy ratio parameter e.g. in frequency bands (e.g. indicating the proportion of the sound energy that is directional) can be also utilized as the spatial metadata for an audio codec or renderer. These parameters can be estimated from microphone-array captured audio signals; for example a mono or stereo signal can be generated from the microphone array signals to be conveyed with the spatial metadata. The mono or stereo signal could be encoded, for instance, with a core coder like 3GPP EVS or a derivative of it. A decoder can decode the audio signals into and process the sound in frequency bands (using the transmitted spatial metadata) to obtain the spatial output, which could be a binaural output, a loudspeaker multi-channel signal or a multichannel signal in Ambisonics format.

MOTIVATION

Immersive speech communication is a new domain of research and very few systems exist, moreover no DTX systems were designed for such application.

However, it can be straightforward to combine existing solutions. One can for example apply independently DTX on each individual multi-channel signal. This simplistic approach faces several problems. For this, one needs to transmit discretely each individual channel which is incompatible with the low bit-rate communication constraints and therefore hardly compatible with DTX, which is designed for low bit-rate communication cases. Moreover it is then required to synchronize the VAD decision across the channels to avoid oddities and unmasking effects and also to fully exploit the bit-rate reduction of the DTX system. Indeed for interrupting the transmission and profit from it, one needs to make sure that Voice Activity Decisions are synchronized across all channels.

Another problem arises on the receiver side, when generating the missing background noise during inactive frames by the comfort noise generator(s). For immersive communications, especially when directly applying DTX to individual channels, one generator per channel is required. If these generators, which typically sample a random noise, are used independently, the coherence between channels will be zero or close to zero and may deviate perceptually from the original soundscape. On the other hand, if only one generator is used and the resulting comfort noise copied to all output channels, the coherence will be very high and immersivity will be drastically reduced.

These problems can be partially solved by applying DTX not directly to the input or output channels of the system, but instead after a parametric spatial audio coding scheme, like DirAC, on the resulting transport channels, which are usually a downmixed or reduced version of the original multichannel signal. In this case, it is necessary to define how inactive frames are parameterized and then spatialized by the DTX system. This is not trivial and is the subject of embodiments of the present invention. The spatial image has to be consistent between active and inactive frames, and has to be as faithful perceptually as possible to the original background noise.

Figure 3:
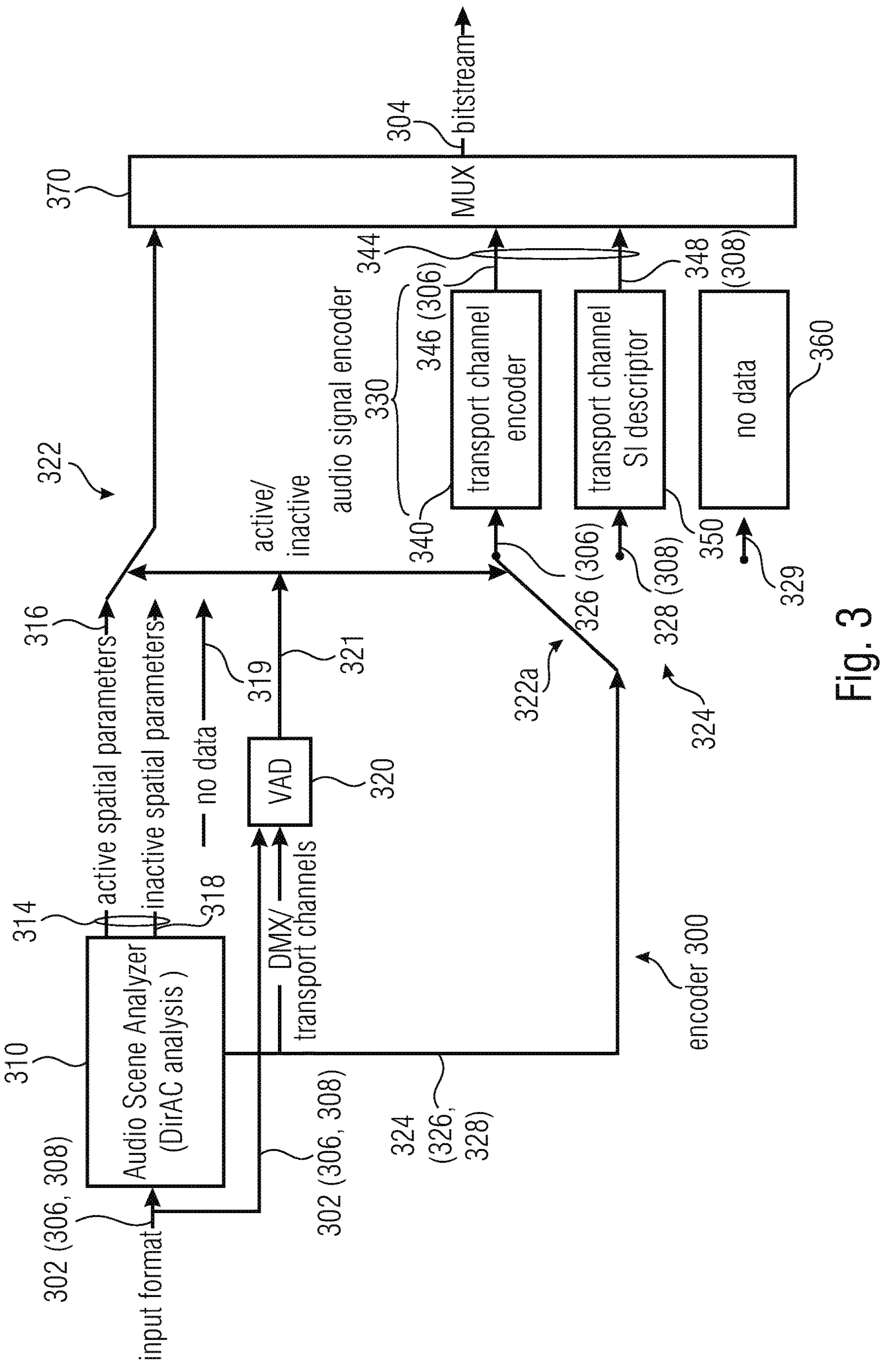
FIG. 3 shows an example of an encoder according to an example.

FIG. 3 shows an encoder 300 according to an example. The encoder 300 may generate an encoded audio scene 304 from an audio signal 302.

The audio signal 304 (bitstream) or the audio scene 304 (and also other audio signals disclosed below) may be divided into frames (e.g. it may be a sequence of frames). The frames may be associated to time slots, which may be defined subsequently one with another (in some examples, a preceding aspect may overlap with a subsequent frame). For each frame, values in the time domain (TD) or frequency domain (FD) may be written in the bitstream 304. In TD, values may be provided for each sample (each frame having e.g. a discrete a sequence of samples). In FD, values may be provided for each frequency bin. As will be explained later, each frame may be classified (e.g. by an activity detector) either as an active frame 306 (e.g., non-void frame) or inactive frame 308 (e.g., void frames, or silence frames, or only-noise frames). Different parameters (e.g. active spatial parameters 316 or inactive spatial parameters 318) may also be provided in association to the active frame 306 and inactive frame 308 (in case of no data, reference numeral 319 shows that no data is provided).

The audio signal 302 may be, for example, a multichannel audio signal (e.g. with two channels or more). The audio signal 302 may be, for example, a stereo audio signal. The audio signal 302 may be, for example, an Ambisonics signal, e.g., in A-format or B-format. The audio signal 302 may have, for example, a MASA (metadata assisted spatial audio) format. The audio signal 302 may have an input format being a first order Ambisonics format, a higher order Ambisonics format, a multi-channel format associated with a given loudspeaker setup, such as 5.1 or 7.1 or 7.1+4, or one or more audio channels representing one or several different audio objects localized in a space as indicated by information included in associated metadata, or an input format being a metadata associated spatial audio representation. The audio signal 302 may comprise a microphone signal as picked up by real microphones or virtual microphones. The audio signal 302 may comprise a synthetically created microphone signal (e.g. being in a first order Ambisonics format, or a higher order Ambisonics format).

The audio scene 304 may comprise at least one or a combination of:

- a first soundfield parameter representation (e.g. active spatial parameter) 316 for the first frame 306;
- a second soundfield parameter representation (e.g. inactive spatial parameter) 318 for the second frame 308;
- an encoded audio signal 346 for the first frame 306; and
- a parametric description 348 for the second frame 308 (in some examples, the inactive spatial parameter 318 may be included in the parametric description 348, but the parametric description 348 may also include other parameters, which are not spatial parameters).

Active frames 306 (first frames) may be those frames that contain speech (or, in some examples, also other audio sounds different from pure noise). Inactive frames 308 (second frames) may be understood as being those frames that do not comprise speech (or, in some examples, also other audio sounds different from pure noise) and may be understood as containing uniquely noise.

An audio scene analyzer (soundfield parameter generator) 310 may be provided, for example, to generate a transport channel version 324 (subdivided among 326 and 328) of the audio signal 302. Here, we may refer to transport channel(s) 326 of each first frame 306 and/or transport channel(s) 328 of each second frame 308 (transport channel(s) 328 may be understood as providing a parametric description of silence or noise, for example). The transport channel(s) 324 (326, 328) may be a downmix version of the input format 302. In general terms, each of the transport channels 326, 328 may be, for example, one single channel if the input audio signal 302 is a stereo channel. If the input audio signal 302 has more than two channels, the downmix version 324 of the input audio signal 302 may have less channels than the input audio signal 302, but still more than one channel in some examples (e.g., if the input audio signal 302 has four channels, the downmix version 324 may have one, two, or three channels).

The audio signal analyzer 310 may additionally or in alternative provide soundfield parameters (spatial parameters), indicated with 314. In particular, the soundfield parameters 314 may include active spatial parameters (first spatial parameters or first spatial parameter representation) 316 associated to the first frame 306, and inactive spatial parameters (second spatial parameters or second spatial parameter representation) 318 associated to the second frame 308. Each active spatial parameter 314 (316, 318) may comprise (e.g. be) a parameter indicating a spatial characteristic of the audio signal (302) e.g. with respect to a listener position. In some other examples, the active spatial parameter 314 (316, 318) may comprise (e.g. be) at least partially a parameter indicating a characteristic of the audio signal 302 with respect to the position of the loudspeakers. In some examples, the active spatial parameter 314 (316, 318) may be or at least partially comprise characteristics of the audio signal as taken from the signal source.

For example, the spatial parameters 314 (316, 318) can include diffuseness parameters: e.g. one or more diffuseness parameter(s) indicating a diffuse to signal ratio with respect to the sound in the first frame 306 and/or in the second frame 308, or one or more energy ratio parameter(s) indicating an energy ratio of a direct sound and a diffuse sound in the first frame 306 and/or in the second frame 308, or an interchannel/surround coherence parameter(s) in the first frame 306 and/or in the second frame 308, or a Coherent-to-Diffuse Power ratio(s) in the first frame 306 and/or in the second frame 308, or a signal-to-diffuse ratio(s) in the first frame 306 and/or in the second frame 308

In examples, the active spatial parameter(s) (first soundfield parameter representation) 316 and/or the inactive spatial parameter(s) 318 (second soundfield parameter representation) may be obtained from the input signal 302 in its full-channel version, or a subset of it, like the first order component of a higher order Ambisonics input signal.

The apparatus 300 may include an activity detector 320. The activity detector 320 may analyze the input audio signal (either in its input version 302 or in its downmix version 324), to determine, depending on the audio signal (302 or 324) whether a frame is an active frame 306 or an inactive frame 308, hence performing a classification on the frame. As can be seen from FIG. 3, the activity detector 320 can be assumed as controlling (e.g. through the control 321) a first deviator 322 and a second deviator 322*a*. The first deviator 322 may select between the active spatial parameter 316 (first soundfield parameter representation) and the inactive spatial parameters 318 (second soundfield parameter representation). Therefore, the activity detector 320 may decide whether the active spatial parameters 316 or the inactive spatial parameters 318 are to be outputted (e.g. signalled in the bitstream 304). The same control 321 may control the second deviator 322*a*, which may select between outputting the first frame 326 (306) in the transport channel 324, or the second frame 328 (308) (e.g. parametric description) in the transport channel 326. The activities of the first and second deviators 322 and 322*a* are coordinated with each other: when the active spatial parameters 316 are outputted, then the transport channels 326 of the first frame 306 are also outputted, and when the inactive spatial parameters 318 are outputted, then the transport channels 328 of the first frame 306 the transport channels are outputted. This is because the active spatial parameters 316 (first soundfield parameter representation) describe spatial characteristics of the first frame 306, while the inactive spatial parameters 318 (second soundfield parameter representation) describes spatial characteristics of the second frame 308.

The activity detector 320 may therefore basically decide which one among the first frame 306 (326, 346), and its related parameters (316), and the second frame 308 (328, 348), and its related parameters (318), are to be outputted. The activity detector 320 may also control the encoding of some signalling in the bitstream which signals whether the frame is an active or an inactive (other techniques may be used).

The activity detector 320 may perform processing on each frame 306/308 of the input audio signal 302 (e.g., by measuring energy in the frame, e.g., in all, or at least a plurality of, the frequency bins of the particular frames of the audio signal) and may classify the particular frame as being a first frame 306 or a second frame 308. In general terms, the activity detector 320 may decide one single classification result for one single, whole frame, without distinguishing between different frequency bins and different samples of the same frame. For example, one classification result could be “speech” (which would amount to the first frame 306, 326, 346, spatially described by the active spatial parameters 316) or “silence” (which would amount to second frame 308, 328, 348, spatially described by the inactive spatial parameters 318). Therefore, according to the classification exerted by the activity detector 320, the deviators 322 and 322*a* may perform their switching, and their result is in principle valid for all the frequency bins (and samples) of the classified frame.

The apparatus 300 may include an audio signal encoder 330. The audio signal encoder 330 may generate an encoded audio signal 344. The audio signal encoder 330 may, in particular, provide an encoded audio signal 346 for the first frame (306, 326), e.g. generated by a transport channel encoder 340 which may be part of the audio signal encoder 330. The encoded audio signal 344 may be or include a parametric description 348 of silence (e.g., parametric description of noise) and may be generated, by a transport channel SI descriptor 350, which may be part of the audio signal encoder 330. The generated second frame 348 may correspond to at least one second frame 308 of the original audio input signal 302 and to at least one second frame 328 of the downmix signal 324, and may be spatially described by the inactive spatial parameters 318 (second soundfield parameter representation). Notably, the encoded audio signal 344 (whether 346 or 348) may also be in the transport channel (and may therefore be a downmix signal 324). The encoded audio signal 344 (whether 346 or 348) may be compressed, so as to reduce its size.

The apparatus 300 may include an encoded signal former 370. The encoded signal former 370 may write an encoded version of at least the encoded audio scene 304. The encoded signal former 370 may operate by bringing together the first (active) soundfield parameter representation 316 for the first frame 306, the second (inactive) soundfield parameter representation 318 for the second frame 308, the encoded audio signal 346 for the first frame 306, and the parametric description 348 for the second frame 308. Accordingly, the audio scene 304 may be a bitstream, which may either be transmitted or stored (or both) and used by a generic decoder for generating an audio signal to be output, which is a copy of the original input signal 302. In the audio scene (bitstream) 304, sequence of “first frames”/“second frames” may therefore be obtained, for permitting a reproduction of the input signal 306.

Figure 2:
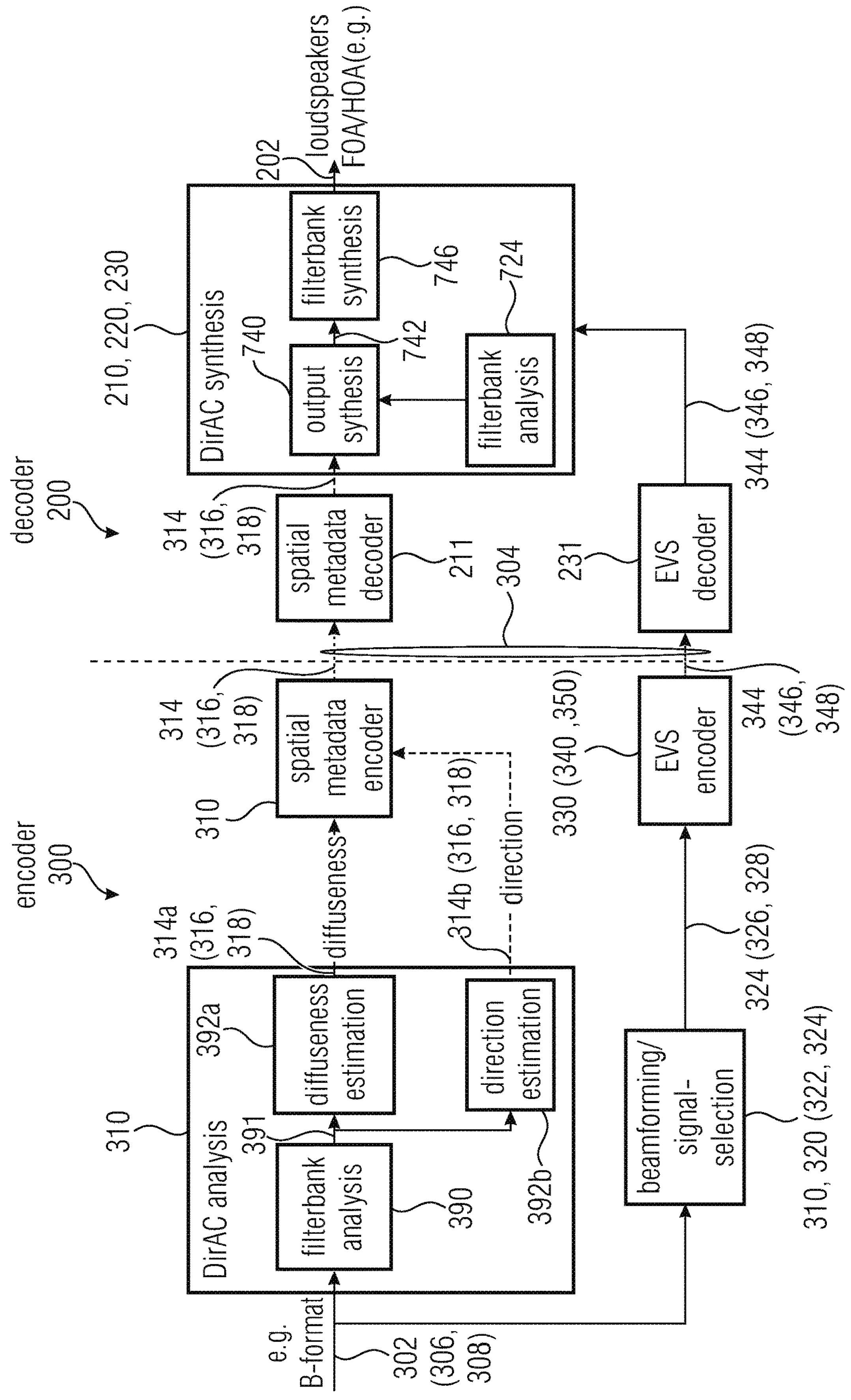
FIG. 2 shows an example of a decoder and an encoder according to examples.

FIG. 2 shows an example of an encoder 300 and a decoder 200. The encoder 300 may be the same of (or a variation of) that of FIG. 3 in some examples (in some other examples, they can be different embodiments). The encoder 300 may have in input the audio signal 302 (which may, for example, be in B-format) and may have a first frame 306 (which can be, for example, be an active frame) and a second frame 308 (which can be, for example, an inactive frame). The audio signal 302 may be provided, as signal 324 (e.g., as encoded audio signal 326 for the first frame and encoded audio signal 328, or parametric representation, for the second frame), to the audio signal encoder 330 after a selection internal in the selector 320 (which may include audio associated to the deviators 322 and 322*a*). Notably, the block 320 can also have the capabilities of forming the downmix from the input signal 302 (306, 308) onto the transport channels 324 (326, 328). Basically, the block 320 (beamforming/signal-selection block) may be understood as including functionalities of the activity detector 320 of FIG. 3, but some other functionalities (such as the generation of the spatial parameters 316 and 318) which in FIG. 3 are performed by block 310 may be performed by “DirAC analysis block” 310 of FIG. 2. Therefore, the channel signal 324 (326, 328) may be a downmixed version of the original signal 302. In some cases, however, it could also be possible that no downmixing is performed on the signal 302, and a signal 324 is simply a selection between the first and second frames. The audio signal encoder 330 may include at least one of the blocks 340 and 350 as explained above. The audio signal encoder 330 may output the encoded audio signal 344 either for the first frame 346 or for the second frame 348. FIG. 2 does not show the encoded signal former 370, which may notwithstanding be present.

As shown, block 310 may include a DirAC analysis block (or more in general, soundfield parameter generator 310). The block 310 (soundfield parameter generator) may include a filterbank analysis 390. The filterbank analysis 390 may subdivide each frame of the input signal 302 onto a plurality of frequency bins, which may be the output 391 of the filterbank analysis 390. A diffuseness estimation block 392*a* may provide diffuseness parameters 314*a* (which may be one diffuseness parameter of the active spatial parameter(s) 316 for an active frame 306 or one diffuseness parameter in of the inactive spatial parameter(s) 318 for an inactive frame 308), e.g. for each frequency bin of the plurality of frequency bins 391 outputted by the filterbank analysis 390. The soundfield parameter generator 310 may include a direction estimation block 392*b*, whose output 314*b* may be a direction parameter (which may be one direction parameter of the active spatial parameter(s) 316 for an active frame 306 or one direction parameter in of the inactive spatial parameter(s) 318 for an inactive frame 308), e.g. for each frequency bin of the plurality of frequency bins 391 outputted by the filterbank analysis 390.

Figure 4:
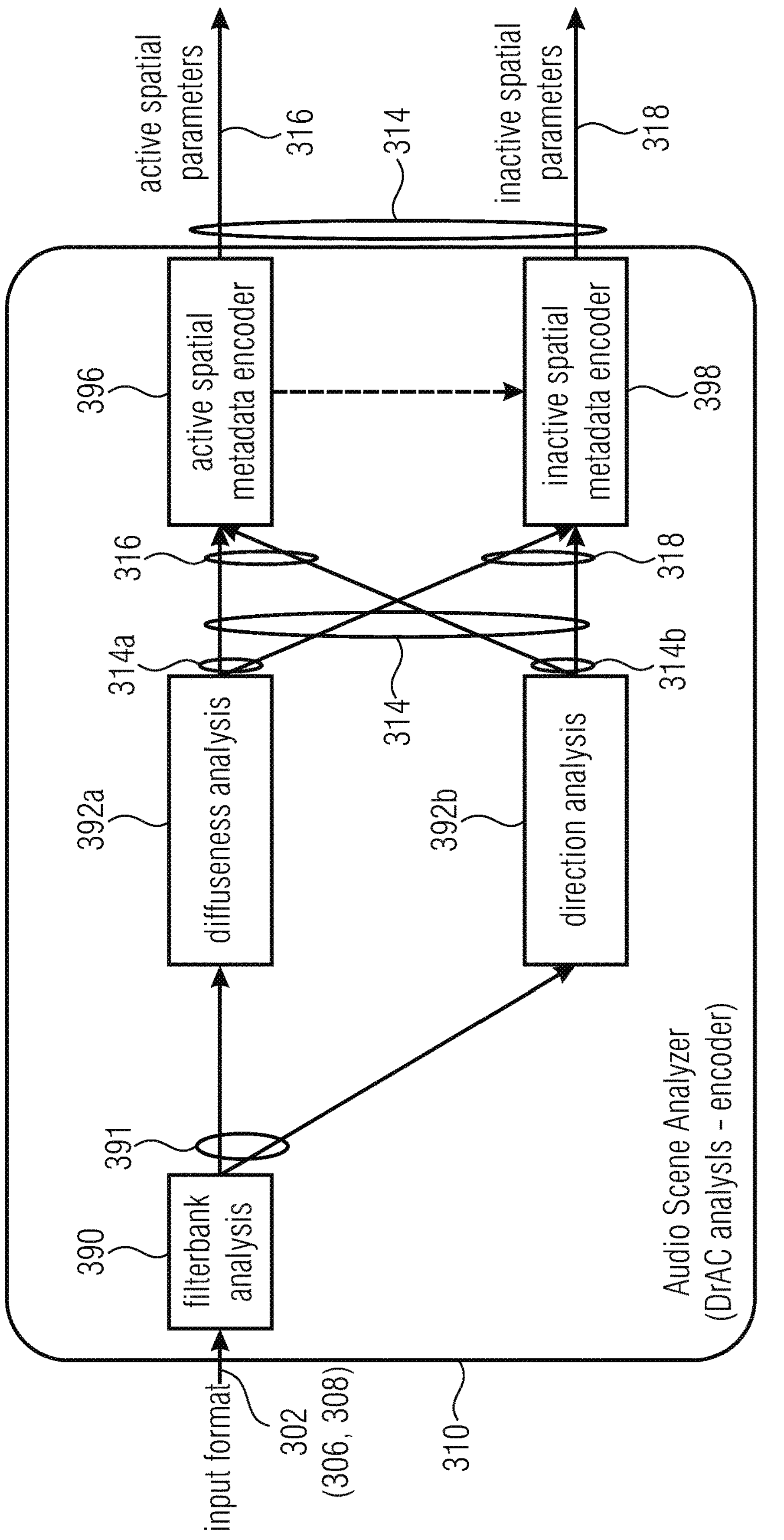
FIGS. 4 and 5 show examples of components.

FIG. 4 shows an example of block 310 (soundfield parameter generator). The soundfield parameter generator 310 may be the same of that of FIG. 2 and/or may be the same or at least implement functionalities of block 310 of FIG. 3, despite the fact that block 310 of FIG. 3 is also capable of performing a downmix of the input signal 302, while this is not shown (or not implemented) in the soundfield parameter generator 310 of FIG. 4.

The soundfield parameter generator 310 of FIG. 4 may include a filterbank analysis block 390 (which may be the same of the filterbank analysis block 390 of FIG. 2). The filterbank analysis block 390 may provide frequency domain information 391 for each frame and for each bin (frequency tile). The frequency domain information 391 may be provided to a diffuseness analysis block 392*a* and/or a direction analysis block 392*b*, which may be those shown in FIG. 3. The diffuseness analysis block 392*a* and/or direction analysis block 392*b* may provide diffuseness information 314*a* and/or direction information 314*b*. These can be provided for each first frame 306 (346) and for each second frame 308 (348). Complexively, the information provided by the block 392*a* and 392*b* is considered soundfield parameters 314 which encompass both first soundfield parameters 316 (active spatial parameters) and second soundfield parameters 318 (inactive spatial parameters). The active spatial parameters 316 may be provided to an active spatial metadata encoder 396 and the inactive spatial parameters 318 may be provided to an inactive spatial metadata encoder 398. The resulting are first and second soundfield parameter representations (316, 318, complexively indicated with 314) which may be encoded in the bitstream 304 (e.g., through the encoder signal former 370) and stored for being subsequently played back by a decoder. Whether the active spatial metadata encoder 396 or the inactive spatial parameters 318 is to encode a frame, this may be controlled by a control such as the control 321 in FIG. 3 (the deviator 322 is not shown in FIG. 2), e.g. thorough the classification operated by the activity detector. (It is to be noted that the encoders 396, 398 may also perform a quantization, in some examples).

Figure 5:
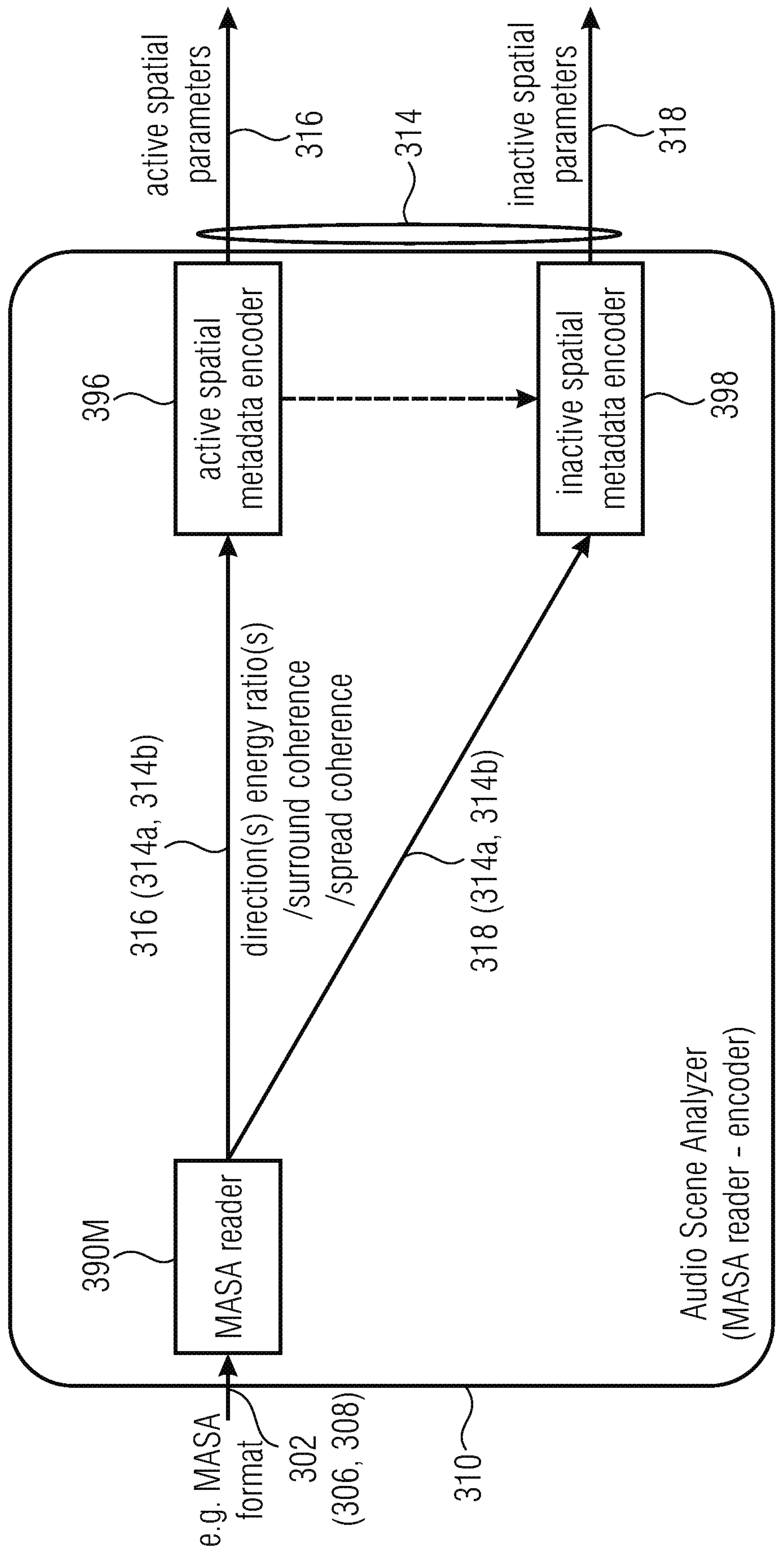

FIG. 5 shows another example of possible soundfield parameter generator 310, which may be alternative to that of FIG. 4, and which may also be implemented in the examples of FIGS. 2 and 3. In this example, the input audio signal 302 can already be in MASA format, in which spatial parameters are already part of the input audio signal 302 (e.g., as spatial metadata), e.g. for each frequency bin of a plurality of frequency bins. Accordingly, there is no need for having a diffuseness analysis block and/or a directional block, but they can be substituted by a MASA reader 390M. The MASA reader 390M may read specific data fields in the audio signal 302, which already contain information such as the active spatial parameter(s) 316 and the inactive spatial parameter(s) 318 (according to the fact whether the frame of the signal 302 is a first frame 306 or a second frame 308). Examples of parameters that may be encoded in the signal 302 (and which may be read by the MASA reader 390M) may include at least one of a direction, energy ratio, surround coherence, spread coherence, and so on. Downstream to the MASA reader 390M, an active spatial metadata encoder 396 (e.g., like the one of FIG. 4) and an inactive spatial metadata encoder 398 (e.g., like the one of FIG. 4) may be provided, to output the first soundfield parameter representation 316 and the second soundfield parameter representation 318, respectively. If the input audio signal 302 is a MASA signal, then the activity detector 320 may be implemented as an element which reads a determined data field in the input MASA signal 302, and classifies as active frame 306 or inactive frame 308 based on the value encoded in the data field. The example of FIG. 5 can be generalized for an audio signal 302 which has already encoded therein spatial information which can be encoded as active spatial parameter 316 or inactive spatial parameter 318.

Embodiments of the present invention are applied in a spatial audio coding system, e.g. illustrated in FIG. 2, where a DirAC-based spatial audio encoder and decoder are depicted. A discussion thereof follows here.

The encoder 300 may usually analyze the spatial audio scene in B-format. Alternatively, DirAC analysis can be adjusted to analyze different audio formats like audio objects or multichannel signals or the combination of any spatial audio formats.

The DirAC analysis (e.g. as performed at any of stages 392*a*, 392*b*) may extract a parametric representation from the input audio scene 302 (input signal). A direction of arrival (DOA) 314*b* and/or a diffuseness 314*a* measured per time-frequency unit form the parameter(s) 316, 318. The DirAC analysis (e.g. as performed at any of stages 392*a*, 392*b*) may be followed by a spatial metadata encoder (e.g. 396 and/or 398), which may quantize and/or encode the DirAC parameters to obtain a low bit-rate parametric representation (in the figures, the low bit-rate parametric representations 316, 318 are indicated with the same reference numerals of the parametric representations upstream to the spatial metadata encoders 396 and/or 398).

Along with the parameters 316 and/or 318, a down-mix signal 324 (326) derived from the different source(s) (e.g. different microphones) or audio input signal(s) (e.g. different components of a multichannel signal) 302 may be coded (e.g. for transmission and/or for storage) by a conventional audio core-coder. In the advantageous embodiment, an EVS audio coder (e.g. 330, FIG. 2) may be advantageous for coding the down-mix signal 324 (326, 328), but embodiments of the invention are not limited to this core-coder and can be applied to any audio core-coder. The downmix signal 324 (326, 328) may consist, for example, of different channels, also called transport channels: the signal 324 can be, e.g., or comprise, the four coefficient signals composing a B-format signal, a stereo pair or a monophonic down-mix depending on the targeted bit-rate. The coded spatial parameters 328 and the coded audio bitstream 326 may be multiplexed before being transmitted over the communication channel (or stored).

In the decoder (see below), the transport channels 344 are decoded by a core-decoder, while the DirAC metadata (e.g., spatial parameters 316, 318) may be first decoded before being conveyed with the decoded transport channels to the DirAC synthesis. The DirAC synthesis uses the decoded metadata for controlling the reproduction of the direct sound stream and its mixture with the diffuse sound stream. The reproduced sound field can be reproduced on an arbitrary loudspeaker layout or can be generated in Ambisonics format (HOA/FOA) with an arbitrary order.

DirAC Parameter Estimation

It is here explained a non-limiting technique for estimating the spatial parameters 316, 318 (e.g. diffuseness 314*a*, direction 314*b*). The example of B-format is provided.

In each frequency band (e.g., as obtained from the filterbank analysis 390), the direction of arrival 314*a* of sound together with the diffuseness 314*b* of the sound may be estimated. From the time-frequency analysis of the input B-format components $w^i(n)$, $x^i(n)$, $y^i(n)$, $z^i(n)$, pressure and velocity vectors can be determined as:

$$p^i(n,k)=W^i(n,k)$$

$$U^i(n,k)=X^i(n,k)e_x+Y^i(n,k)e_y+Z^i(n,k)_{e_z}$$

where i is the index of the input 302 and, k and n time and frequency indices of the time-frequency tile, and $e_x$, $e_y$, $e_z$ represent the Cartesian unit vectors. P(n, k) and U(n, k) may be necessary, in some examples, to compute the DirAC parameters (316, 318), namely DOA 314*a* and diffuseness 314*a* through, for example, the computation of the intensity vector:

$$I(k,n)=\frac{1}{2}\Re\{P(k,n)\cdot\overline{U(n,k)}\},$$

where $\overline{(.)}$ denotes complex conjugation. The diffuseness of the combined sound field is given by:

$$\psi(k,n)=1-\frac{\|E\{I(k,n)\}\|}{cE\{E(k,n)\}}$$

where E{.} denotes the temporal averaging operator, c the speed of sound and E(k, n) the sound field energy given by:

$$E(n,k)=\frac{\rho_0}{4}\|U(n,k)\|^2+\frac{1}{\rho_0 c^2}|P(n,k)|^2$$

The diffuseness of the sound field is defined as the ratio between sound intensity and energy density having values between 0 and 1.

The direction of arrival (DOA) is expressed by means of the unit vector direction (n, k), defined as $$\text{direction}(n,k)=-\frac{I(n,k)}{\|I(n,k)\|}$$

The direction of arrival 314*b* can be determined by an energetic analysis (e.g., at 392*b*) of the B-format input signal 302 and can be defined as opposite direction of the intensity vector. The direction is defined in Cartesian coordinates but can e.g. be easily transformed in spherical coordinates defined by a unity radius, the azimuth angle and elevation angle.

In the case of transmission, the parameters 314*a*, 314*b* (316, 318) needed to be transmitted to the receiver side (e.g. decoder side) via a bitstream (e.g. 304). For a more robust transmission over a network with limited capacity, a low bit-rate bitstream is advantageous or even necessary, which can be achieved by designing an efficient coding scheme for the DirAC parameters 314*a*, 314*b* (316, 318). It can employ for example techniques such as frequency band grouping by averaging the parameters over different frequency bands and/or time units, prediction, quantization and entropy coding. At the decoder, the transmitted parameters can be decoded for each time/frequency unit (k,n) in case no error occurred in the network. However, if the network conditions are not good enough to ensure proper packet transmission, a packet may be lost during transmission. Embodiments of the present invention aim to provide a solution in the latter case.

Decoder

Figure 6:
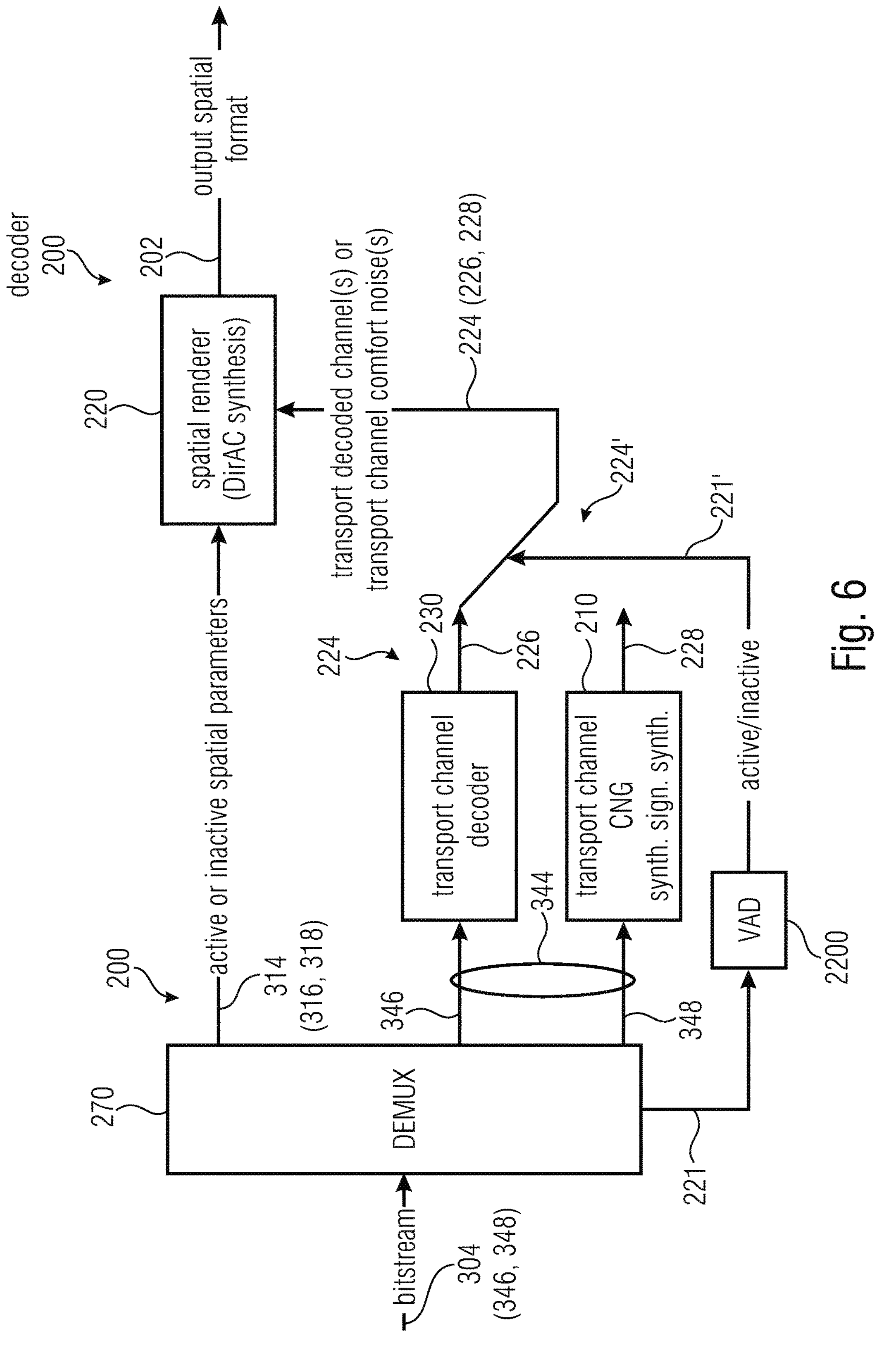
FIGS. 6-11 show examples of decoders.

FIG. 6 shows an example of a decoder apparatus 200. It may be an apparatus for processing an encoded audio scene (304) comprising, in a first frame (346), a first soundfield parameter representation (316) and an encoded audio signal (346), wherein a second frame (348) is an inactive frame. The decoder apparatus 200 may comprise at least one of:

- an activity detector (2200) for detecting that the second frame (348) is the inactive frame and for providing a parametric description (328) for the second frame (308);
- a synthetic signal synthesizer (210) for synthesizing a synthetic audio signal (228) for the second frame (308) using the parametric description (348) for the second frame (308);
- an audio decoder (230) for decoding the encoded audio signal (346) for the first frame (306); and
- a spatial renderer (240) for spatially rendering the audio signal (202) for the first frame (306) using the first soundfield parameter representation (316) and using the synthetic audio signal (228) for the second frame (308).

Notably, the activity detector (2200) may exert a command 221' which may determine whether the input frame is classified as an active frame 346 or an inactive frame 348. The activity detector 2200 may determine the classification of the input frame, for example, from an information 221 which is either signalled, or determined from the length of the obtained frame.

The synthetic signal synthesizer (210) may, for example, generate noise 228 e.g. using the information (e.g. parametric information) obtained from the parametric representation 348. The spatial renderer 220 may generate the output signal 202 in such a way that the inactive frames 228 (obtained from the encoded frames 348) are processed through the inactive spatial parameter(s) 318, to obtain that a human listener has a 3D spatial impression of the provenience of the noise.

It is noted that in FIG. 6 the numerals 314, 316, 318, 344, 346, 348 are the same of the numerals of FIG. 3, since they correspond as being obtained from the bitstream 304. Notwithstanding, it may be that some slight differences (e.g., due to quantization) are present.

FIG. 6 also shows a control 221' which may control a deviator 224', so that the signal 226 (outputted by the synthetic signal synthesizer 210) or the audio signal 228 (outputted by the audio decoder 230) may be selected, e.g. through the classification operated by the activity detector 220. Notably, the signal 224 (either 226 or 228) may still be a downmix signal, which may be provided to the spatial renderer 220 so that the spatial renderer generates the output signal 202 through the active or inactive spatial parameters 314 (316, 318). In some examples, the signal 224 (either 226 or 228) can notwithstanding be upmixed, so that the number of channels of the signal 224 is increased with respect to the encoded version 344 (346, 348). In some examples, despite being upmixed, the number of channels of the signal 224 may be less than the number of channel of the output signal 202.

Here below, other examples of the decoder apparatus 200 are provided. FIGS. 7-10 show examples of decoder apparatus 700, 800, 900, 1000 which may embody the decoder apparatus 200.

Even though in FIGS. 7-10 some elements are shown as being internal to the spatial renderer 220, they may be notwithstanding outside of the spatial renderer 220 in some examples. For example, the synthetic synthesizer 210 may either be partially or totally external to the spatial renderer 220.

In those examples, a parameter processor 275 (which may be either internal or external to the spatial renderer 220) may be included. The parameter processor 275 may also be considered to be present in the decoder of FIG. 6, despite not being shown.

The parameter processor 275 of any of FIGS. 7-10 may include, for example, an inactive spatial parameter decoder 278 for providing the inactive frames may be parameters 318 (e.g., as obtained from the signaling in the bit stream 304) and/or a block 279 ("recover spatial parameters in non-transmitted frames decoder") which provides inactive spatial parameters which are not read in the bitstream 304, but which are obtained (e.g. recovered, reconstructed, extrapolated, inferred, etc.), e.g., by extrapolation or are synthetically generated.

Therefore, the second soundfield parameter representation may also be a generated parameter 219, which was not present in the bitstream 304. As will be explained later, the recovered (reconstructed, extrapolated, inferred, etc.) spatial parameters 219 may be obtained, for example, through a "hold strategy", to an "extrapolation of the direction strategy" and/or through a "dithering of the direction" (see below). The parameter processor 275 may, therefore, extrapolate or anyway obtain the spatial parameters 219 from the previous frames. As can be seen in FIGS. 6-9, a switch 275' may select between the inactive spatial parameters 318 as signaled in the bitstream 304 and the recovered spatial parameters 219. As explained above, the encoding of the silence frames 348 (SID) (and also of the inactive spatial parameters 318) is updated at a lower bitrate than the encoding of the first frames 346: the inactive spatial parameters 318 are updated with lower frequency with respect to the active spatial parameters 316, and some strategies are performed by the parameter processor 275 (1075) for recovering non-signaled spatial parameters 219 for nontransmitted inactive frames. Accordingly, the switch 275' may select between the signaled inactive spatial parameters 318 and the non-signaled (but recovered or otherwise reconstructed) inactive spatial parameters 219. In some cases, the parameter processor 275' may store one or more soundfield parameter representations 318 for several frames occurring before the second frame or occurring in time subsequent to the second frame, to extrapolate (or interpolate) the soundfield parameters 219 for the second frame. In general terms, the spatial renderer 220 may use, for the rendering of the synthetic audio signal 202 for the second frame 308, the one or more soundfield parameters 318 for the second frame 219. In addition or alternatively, the parameter processor 275 may store soundfield parameter representations 316 for the active spatial parameters (shown in FIG. 10) and synthesize the soundfield parameters 219 for the second frame (inactive frame) using the stored first soundfield parameter representation 316 (active frames) to generate the recovered spatial parameter 319. As shown in FIG. 10 (but also implementable in any of FIGS. 6-9), it is also possible to also include an active spatial parameter decoder 276 from which active spatial parameters 316 can be obtained from the bitstream 304. This may perform a dithering with directions included in the at least two soundfield parameter representations occurring in time before or after the second frame (308), when extrapolating or interpolating to determine the one or more soundfield parameters for the second frame (308).

The synthetic signal synthesizer 210 may be internal to the spatial renderer 220 or may be external or, in some cases, it may have an internal portion and an external portion. The synthetic synthesizer 210 may operate on the downmix channels of the transport channels 228 (which are less than the output channels) (it is noted here that M is a number of downmix channels and N is the number of output channels). The synthetic signal generator 210 (other name for the synthetic signal synthesizer) may generate, for the second frame, a plurality of synthetic component audio signals (in at least one of the channels of the transport signal or in at least one individual component of the output audio format) for individual components related to an outer format of the spatial renderer as the synthetic audio signal. In some cases, this may be in the channels of the downmix signal 228 and in some cases it may be in one of the internal channels of the spatial rendering.

Figure 7:
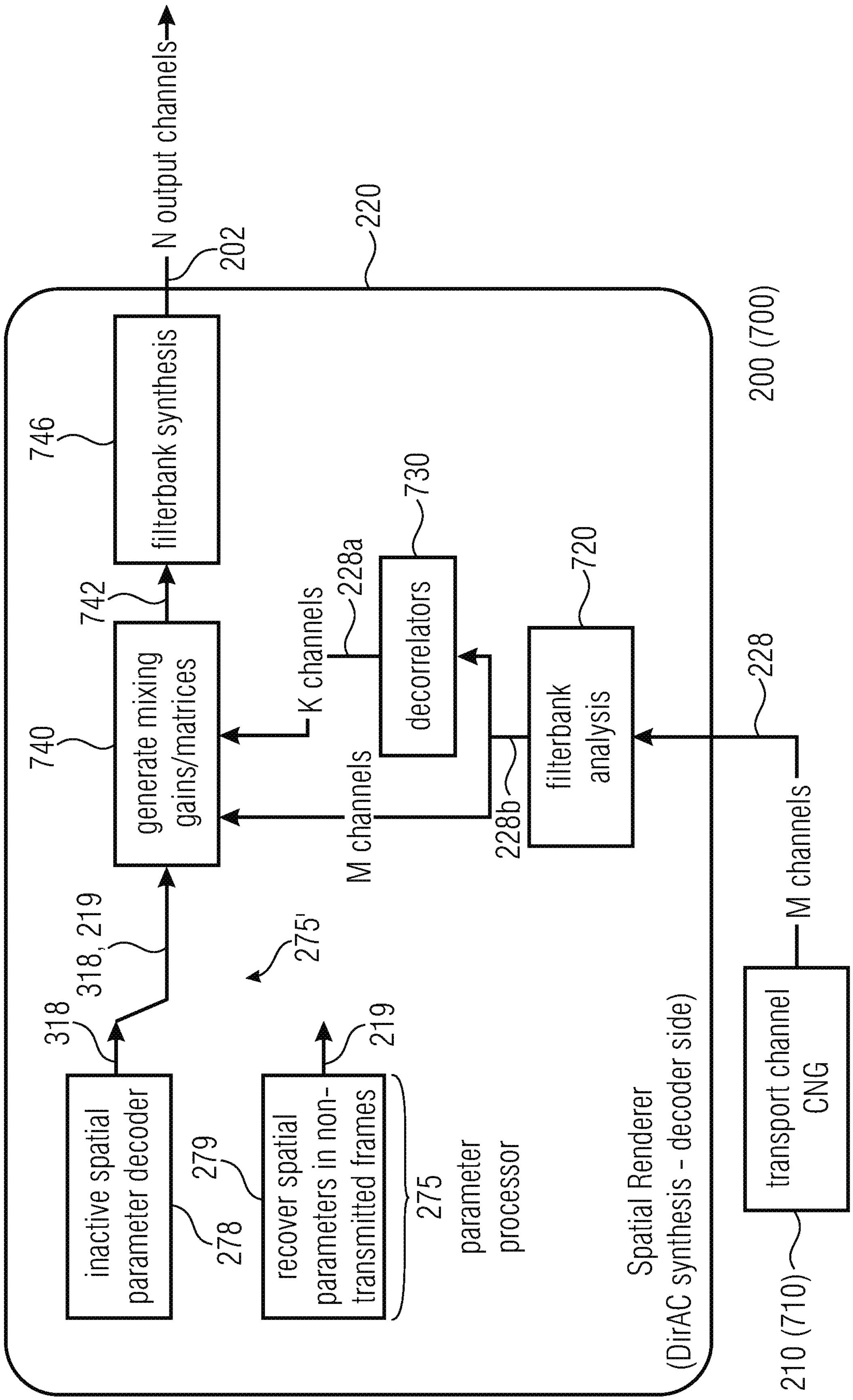
Figure 8:
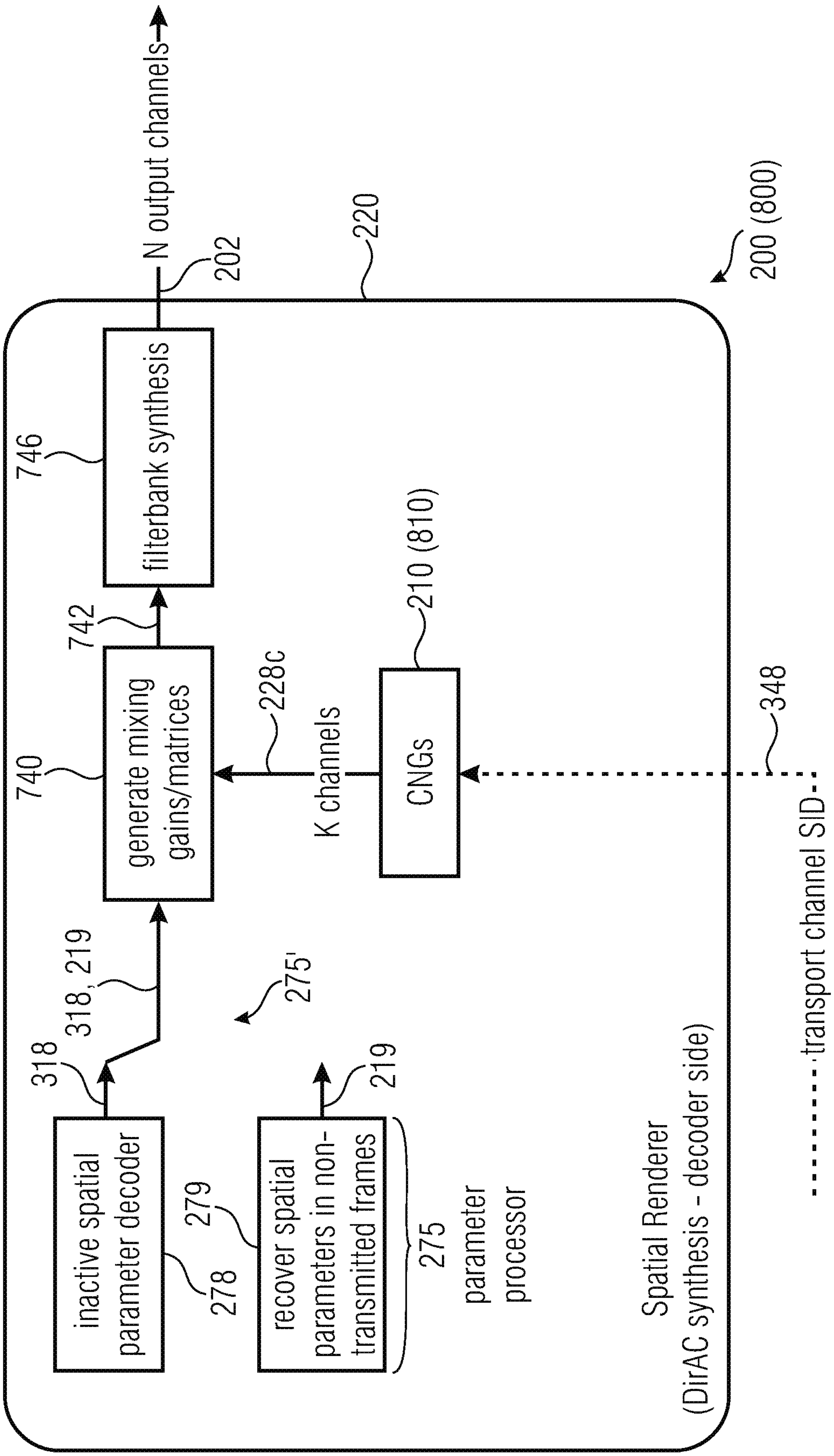

FIG. 7 shows an example in which at least K channels **228*a* obtained from the synthetic audio signal 228 (e.g., in its version 228*b* downstream to a filterbank analysis 720) may be decorrelated. This is obtained, for example, when the synthetic synthesizer 210 generates the synthetic audio signal 228 in at least one of the M channels of the synthetic audio signal 228. This correlating processing 730 may be applied to the signal 228*b* (or at least one or some of its components), downstream to the filterbank analysis block 720, so that at least K channels (with $K \geq M$ and/or $K \leq N$, with N the number of output channels) may be obtained. Subsequently, the K decorrelated channels 228*a* and/or M channels of the signal 228*b* may be provided to a block 740 for generating mixing gains/matrices which, through the spatial parameters 218, 219 (see above), may provide a mixed signal 742. The mixed signal 742 may be subjected to a filterbank synthesis block 746, to obtain the output signal in N output channels 202. Basically, reference numeral 228*a* of FIG. 7 may be an individual synthetic component audio signal which is decorrelated from the individual synthetic component audio signal 228*b*, so that the spatial renderer (and the block 740) makes use of a combination of the component 228*a* and the component 228*b*. FIG. 8 shows an example in which the whole channels 228** are generated in K channels.

Furthermore, in FIG. 7, the decorrelator 730 applied to K decorrelated channels **228*b* downstream to the filterbank analysis block 720. This may be performed, for example, for the diffuse field. In some cases, M channels of the signal 228*b* downstream to the feedback analysis block 720 and may be provided to the block 744 generating mixing gain/matrices. A covariance method may be used for reducing the issues of the decorrelators 730, e.g. by scaling the channels 228*b*** by a value associated with a value complementary to the covariance between the different channels.

FIG. 8 shows an example of synthetic signal synthesizer 210 which is in the frequency domain. A covariance method may be used for the synthetic synthesizer 210 (810) of FIG. 8. Notably, the synthetic audio synthesizer 210 (810) provides its output **228*c* in K channels (with $K \geq M$), while the transport channel 228** would be in M channels.

Figure 9:
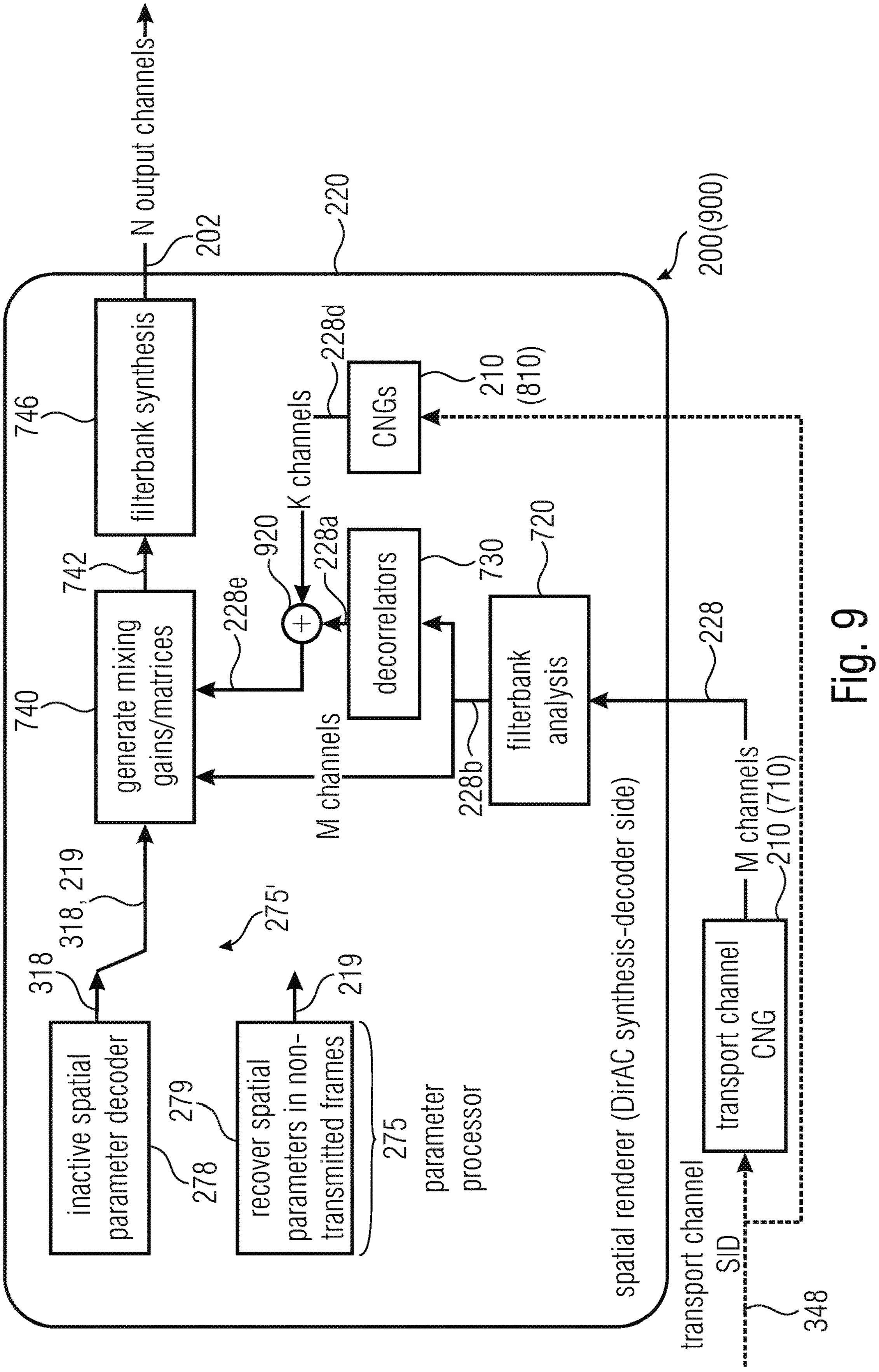
Figure 10:
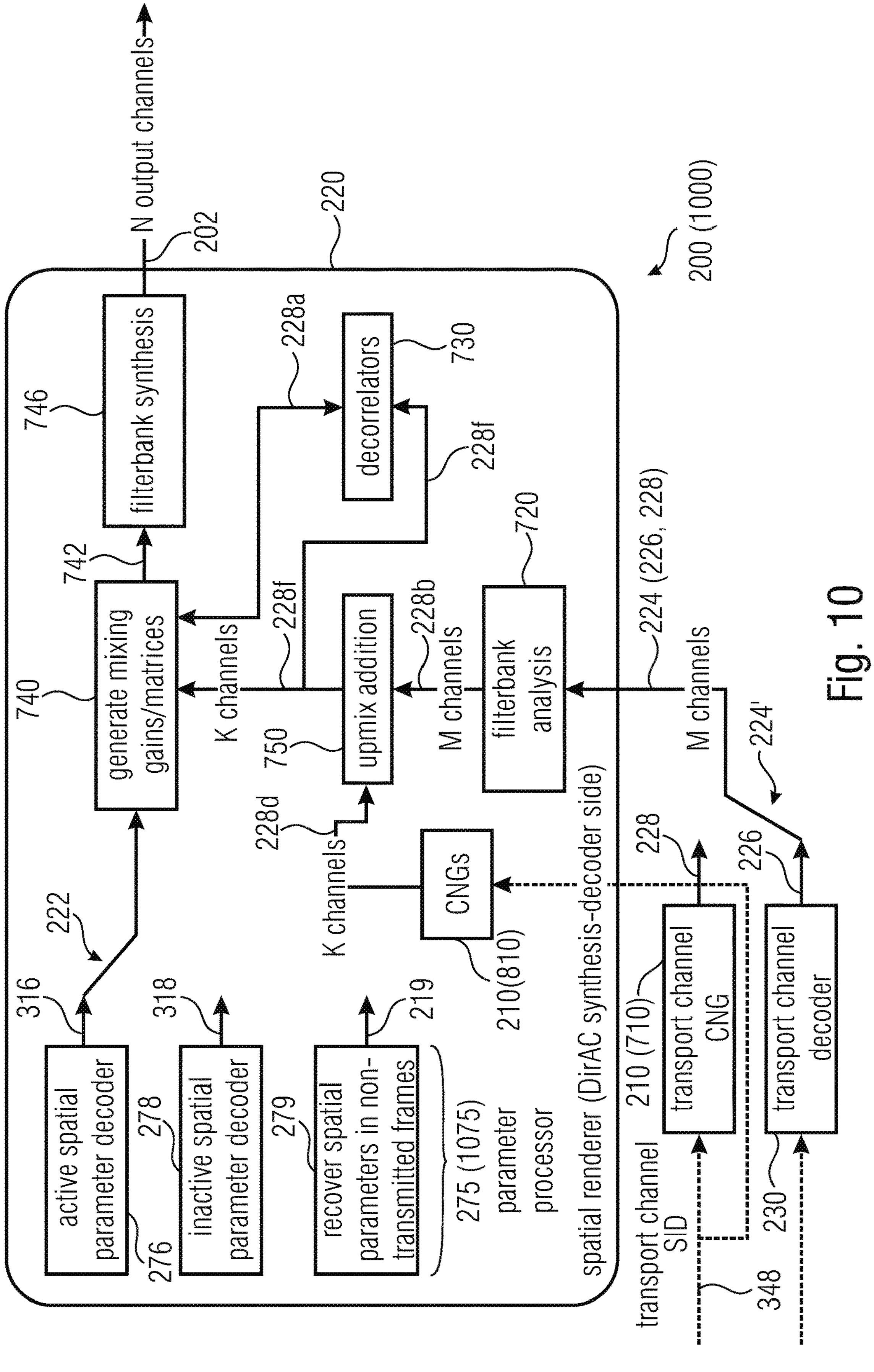

FIG. 9 shows an example of decoder 900 (embodiment of the decoder 200) which may be understood as making use of a hybrid technique of the decoder 800 of FIG. 8 and the decoder 700 of FIG. 7. As can be seen here, the synthetic signal synthesizer 210 includes a first portion 210 (710) which generates a synthetic audio signal 228 in the M channels of the downmix signal 228. The signal 228 may be inputted to a filterbank analysis block 730 which may provide an output 228*b* in which plural filter bands are distinguished from each other. At this time channels 228*b* may be decorrelated to obtain the decorrelated signal 228*a* in K channels. Meanwhile, the output 228*b* of the filterbank analysis in M channels is provided to a block 740 for generating mixing gain matrices which may provide a mixed version of the mixed signal 742. The mixed signal 742 may keep into account the inactive spatial parameters 318 and/or the recovered (reconstructed) spatial parameters for the inactive frames 219. It is to be noted that the output 228*a* of the decorrelator 730 may also be added, at an adder 920, to an output 228*d* of a second portion 810 of the synthetic signal synthesizer 210, which provides a synthetic signal 228*d* in K channels. The signal 228*d* may be summed, at addition block 920, to the decorrelated signal 228*a* to provide summed signal 228*e* to the mixing block 740. Therefore, it is possible to render the final output signal 202 by using a combination of the component 228*b* and the component 228*e* which brings into account both decorrelated components 228*a* and the generated components 228*d*. The components 228*b*, 228*a*, 228*d*, 228*e* (is present) of FIGS. 8 and 7 may be understood, for example, as diffuse and non-diffuse components of the synthetic signal 228. In particular, with reference to the decoder 900 of FIG. 9, basically the low frequency bands of the signal 228*e* can be obtained from the transport channel 710 (and are obtained from 228*a*) and the high frequency bands of the signal 228*e* can be generated in the synthesizer 810 (and are in the channels 228*d*), their addition at the adder 920 permitting to have both in the signal 228*e*.

Notably, in FIGS. 7-10 above there is not shown the transport channel decoder for the active frames.

FIG. 10 shows an example of decoder 1000 (embodiment of the decoder 200) in which both the audio decoder 230 (which provides the decoded channels 226) and the synthetic signal synthesizer 210 (here considered to be divided between a first, external portion 710 and a second, internal portion 810) are shown. A switch 224' is shown which may be analogous to that of FIG. 6 (e.g., controlled by the control or command 221' provided by the activity detector 220). Basically, it is possible to select between a mode in which the decoded audio scene 226 is provided to the spatial renderer 220 and another mode which the synthetic audio signal 228 is provided. The downmix signal 224 (226, 228) is in M channels, which are in general less than the N output channels of the output signal 202.

The signal 224 (226, 228) may be inputted to a filterbank analysis block 720. The output 228*b* of the filterbank analysis 720 (in a plurality of frequency bins) may be inputted onto an upmix addition block 750, which may be also inputted by a signal 228*d* provided by the second portion 810 of the synthetic signal synthesizer 210. The output 228*f* of the upmix addition block 750 may inputted to the correlator processing 730. The output 228*a* of the decorrelator processing 730 may be provided, together to the output 228*f* of the upmix addition block 750, to the block 740 for generating the mixing gain and matrices. The upmix addition block 750 may, for example, increase the number of the channels from M to K (and, in some cases, it can scale them, e.g. by multiplication by constant coefficients) and may add the K channels with the K channels 228*d* generated by the synthetic signal synthesizer 210 (e.g., second, internal portion 810). In order to render a first (active) frame, the mixing block 740 may consider at least one of the active spatial parameters 316 as provided in the bit stream 304, the recovered (reconstructed) spatial parameters 210 as extrapolated or otherwise obtained (see above).

In some examples, the output of the filterbank analysis block 720 may be in M channels but may take into consideration different frequency bands. For the first frames (and the switch 224' and the switch 222' being positioned as in FIG. 10), the decoded signal 226 (in at least two channels) may be provided to the filterbank analysis 720 and may therefore be weighted at the upmix addition block 750 through K noise channels 228*d* (synthetic signal channels) to obtain the signal 228*f* in K channels. It is remembered that K≥M and may comprise, for example, diffuse channel and a directional channel. In particular, the diffuse channel may be decorrelated by the decorrelator 730 to obtain a decorrelated signal 228*a*. Accordingly, the decoded audio signal 224 may be weighted (e.g. at block 750) with the synthetic audio signal 228*d* which can mask the transition between active and inactive frames (first frames and second frames). Then, the second part 810 of the synthetic signal synthesizer 210 is used not only for active frames but also for inactive frames.

Figure 11:
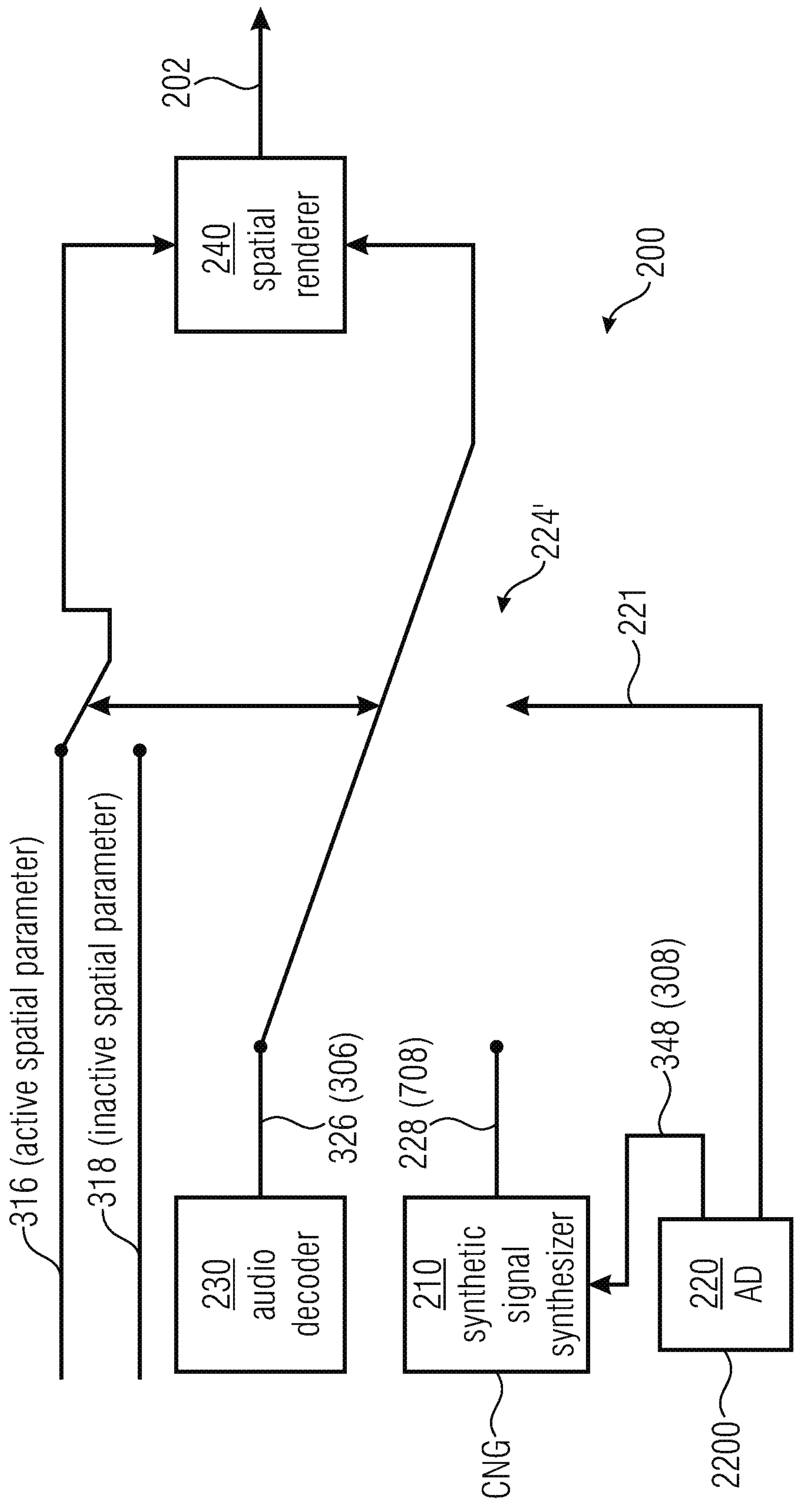

FIG. 11 shows another example of the decoder 200 which may comprise in a first frame (346), a first soundfield parameter representation (316) and an encoded audio signal (346), wherein a second frame (348) is an inactive frame, the apparatus comprising an activity detector (220) for detecting that the second frame (348) is the inactive frame and for providing a parametric description (328) for the second frame (308); a synthetic signal synthesizer (210) for synthesizing a synthetic audio signal (228) for the second frame (308) using the parametric description (348) for the second frame (308); an audio decoder (230) for decoding the encoded audio signal (346) for the first frame (306); and a spatial renderer (240) for spatially rendering the audio signal (202) for the first frame (306) using the first soundfield parameter representation (316) and using the synthetic audio signal (228) for the second frame (308), or a transcoder for generating a meta data assisted output format comprising the audio signal (346) for the first frame (306), the first soundfield parameter representation (316) for the first frame (306), the synthetic audio signal (228) for the second frame (308), and a second soundfield parameter representation (318) for the second frame (308).

With reference to the synthetic signal synthesizer 210 in the examples above, as explained above, it may comprise (or even be) a noise generator (e.g. comfort noise generator). In examples, the synthetic signal generator (210) may comprise a noise generator and the first individual synthetic component audio signal is generated by a first sampling of the noise generator and the second individual synthetic component audio signal is generated by a second sampling of the noise generator, wherein the second sampling is different from the first sampling.

In addition or alternatively, the noise generator comprises a noise table, and wherein the first individual synthetic component audio signal is generated by taking a first portion of the noise table, and wherein the second individual synthetic component audio signal is generated by taking a second portion of the noise table, wherein the second portion of the noise table is different from the first portion of the noise table.

In examples, the noise generator comprises a pseudo noise generator, and wherein the first individual synthetic component audio signal is generated by using a first seed for the pseudo noise generator, and wherein the second individual synthetic component audio signal is generated using a second seed for the pseudo noise generator.

In general terms, the spatial renderer 220, in the examples of FIGS. 6, 7, 9, 10 and 11, may operate in a first mode for the first frame (306) using a mixing of a direct signal and a diffuse signal generated by a decorrelator (730) from the direct signal under a control of the first soundfield parameter representation (316), and in a second mode for the second frame (308) using a mixing of a first synthetic component signal and the second synthetic component signal, wherein the first and the second synthetic component signals are generated by the synthetic signal synthesizer (210) by different realizations of a noise process or a pseudo noise process.

As explained above, the spatial renderer (220) may be configured to control the mixing (740) in the second mode by a diffuseness parameter, an energy distribution parameter, or a coherence parameter derived for the second frame (308) by a parameter processor.

Examples above also regard a method of generating an encoded audio scene from an audio signal having a first frame (306) and a second frame (308), comprising: determining a first soundfield parameter representation (316) for the first frame (306) from the audio signal in the first frame (306) and a second soundfield parameter representation (318) for the second frame (308) from the audio signal in the second frame (308); analyzing the audio signal to determine, depending on the audio signal, that the first frame (306) is an active frame and the second frame (308) is an inactive frame; generating an encoded audio signal for the first frame (306) being the active frame and generating a parametric description (348) for the second frame (308) being the inactive frame; and composing the encoded audio scene by bringing together the first soundfield parameter representation (316) for the first frame (306), the second soundfield parameter representation (318) for the second frame (308), the encoded audio signal for the first frame (306), and the parametric description (348) for the second frame (308).

Examples above also regard a method of processing an encoded audio scene comprising, in a first frame (306), a first soundfield parameter representation (316) and an encoded audio signal, wherein a second frame (308) is an inactive frame, the method comprising: detecting that the second frame (308) is the inactive frame and for providing a parametric description (348) for the second frame (308); synthesizing a synthetic audio signal (228) for the second frame (308) using the parametric description (348) for the second frame (308); decoding the encoded audio signal for the first frame (306); and spatially rendering the audio signal for the first frame (306) using the first soundfield parameter representation (316) and using the synthetic audio signal (228) for the second frame (308), or generating a meta data assisted output format comprising the audio signal for the first frame (306), the first soundfield parameter representation (316) for the first frame (306), the synthetic audio signal (228) for the second frame (308), and a second soundfield parameter representation (318) for the second frame (308).

There is also provided an encoded audio scene (304) comprising: a first soundfield parameter representation (316) for a first frame (306); a second soundfield parameter representation (318) for a second frame (308); an encoded audio signal for the first frame (306); and a parametric description (348) for the second frame (308).

In the examples above, it may be that the spatial parameters 316 and/or 318 are transmitted for each frequency band (subband).

According to some examples, this silence parametric description 348 may contain this partial parameter 318 which may therefore be part of the SID 348.

The spatial parameter 318 for the inactive frames may be valid for each frequency subband (or band or frequency).

The spatial parameters 316 and/or 318 discussed above, transmitted or encoded, during the active phase 346 and in the SID 348 may have different frequency resolution and in addition or alternatively the spatial parameters 316 and/or 318 discussed above, transmitted or encoded, during the active phase 346 and in the SID 348 may have different time resolution and in addition or alternatively the spatial parameters 316 and/or 318 discussed above, transmitted or encoded, during the active phase 346 and in the SID 348 may have different quantization resolution.

It is noted that the decoding device and an encoding device may be devices like CELP or DCX or bandwidth extension modules.

It is also possible to make use and an MDCT-based coding scheme (modified discrete cosine transform).

In the present examples of the decoder apparatus 200 (in any of its embodiments, e.g. those of FIGS. 6-11), it is possible to substitute the audio decoder 230 and the spatial renderer 240 with a transcoder for generating a meta data assisted output format comprising the audio signal for the first frame, the first soundfield parameter representation for the first frame, the synthetic audio signal for the second frame, and a second soundfield parameter representation for the second frame.

DISCUSSION

Embodiments of the present invention propose a way to extend DTX to parametric spatial audio coding. It is therefore proposed to apply a conventional DTX/CNG on the downmix/transport channels (e.g. 324, 224) and to extend it with spatial parameters (called afterward spatial SID) e.g. 316, 318 and a spatial rendering on the inactive frames (e.g. 308, 328, 348, 228) at the decoder side. For restituting the spatial image of the inactive frames (e.g. 308, 328, 348, 228), the transport channel SID 326, 226 is amended with some spatial parameters (spatial SID) 319 (or 219) specially designed and relevant for immersive background noises. Embodiments of the present invention (discussed below and/or above) cover at least two aspects:

- Extend the transport channel SID for spatial rendering. For this the descriptor is amended with spatial parameters 318 e.g. derived from the DirAC paradigm or MASA format. At least one of parameters 318 like diffuseness 314*a*, and/or direction(s) of arrival 314*b*, and/or the inter-channel/surround coherence(s), and/or energy ratios may be transmitted along with the transport channel SID 328 (348). In certain cases and under certain assumptions, some of the parameters 318 could be discarded. For example if we assume that the background noise is completely diffused, we can discard the transmission of the directions 314*b*, which are then meaningless.
- Spatialize at the receiver side the inactive frames by rendering the transport channel CNG in the space: DirAC synthesis principle or one of its derivatives may be employed guided by the eventually transmitted spatial parameters 318 within the spatial SID descriptor of the background noise. At least two options exist, which can even be combined: the transport channel comfort noise generation can be generated only for the transport channels 228 (this is the case of FIG. 7, where the comfort noise 228 is generated by the synthetic signal synthesizer 710); or the transport channel CNG can be also be generated for the transport channels and also for additional channels used in the renderer for the upmixing (this is the case of FIG. 9, where some comfort noise 228 is generated by the synthetic signal synthesizer first portion 710, but some other comfort noise 228*d* is generated by the synthetic signal synthesizer second portion 810). In the latest case, the CNG second portion 710 e.g. sampling a random noise 228*d* with different seed may automatically decorrelate the generated channels 228*d* and minimize the employment of decorrelators 730, which could be sources of typical artefacts. Moreover CNG can be also employed (as shown in FIG. 10) in the active frames but, in some examples, with reduced strength for smoothing the transition between active and inactive phases (frames) and also to mask eventual artefacts from the transport channel coder and the parametric DirAC paradigm.

FIG. 3 depicts an overview of embodiments of the encoder apparatus 300. At the encoder side, the signal can be analyzed by the DirAC analysis. DirAC can analyze signals like B-format or first order Ambisonics (FOA). However it is also possible to extend the principle to higher order Ambisonics (HOA), and even to multi-channel signals associated with a given loudspeaker setup like 5.1, or 7.1 or 7.1+4 as proposed in [10]. The input format 302 can also be individual audio channels representing one, or several different audio objects localized in the space by information included in associated metadata. Alternatively, the input format 302 can be Metadata associated Spatial Audio (MASA). In this case spatial parameters and transport channels are directly conveyed to the encoder apparatus 300. The audio scene analysis (e.g. as shown in FIG. 5) can be then skipped, and only an eventual spatial parameter (re-) quantization and resampling has to be performed for the inactive set of spatial parameters 318 or for both the active and inactive sets of spatial parameters 316, 318.

The audio scene analysis may be done for both active and inactive frames 306, 308 and produce two sets of spatial parameters 316, 318. A first set 316 in case of active frame 308 and another (318) in case of inactive frame 308. It is possible to have no inactive spatial parameters, but in the advantageous embodiment of the invention the inactive spatial parameters 318 are fewer and/or quantized coarser than the active spatial parameters 316. After that two versions of the spatial parameters (also called DirAC metadata) may be available. Importantly embodiments of the present invention can be mainly directed to spatial representations of the audio scene from the listener's perspective. Therefore spatial parameters, like DirAC parameters 318, 316 including one or several direction(s) along with an eventual diffuseness factor or energy ratio(s), are considered. Unlike inter-channel parameters, these spatial parameters from the listener's perspective have the great advantage of being agnostic of the sound capture and reproduction system. This parametrization is not specific to any particular microphone array or loudspeaker layout.

The Voice Activity Detector (or more in general an activity detector) 320 may then be applied on the input signal 302 and/or the transport channels 326 produced by the audio scene analyzer. The transport channels are less than the number of input channels; usually a mono-downmix, a stereo downmix, an A-format, or a First Order Ambisonics signal. Based on the VAD decision the current frame under process is defined as active (306, 326) or inactive (308, 328). In case of active frames (306, 326), a conventional speech or audio encoding of the transport channels is performed. The resulting code data are then combined with the active spatial parameters 316. In case of inactive frames (308, 328), a silence information description 328 of the transport channels 324 is produced episodically, usually at regular frame intervals during inactive phase, for example at every 8 active frames (306, 326, 346). The transport channel SID (328, 348) may then be amended in the multiplexer (encoded signal former) 370 with the inactive spatial parameters. In case the inactive spatial parameters 318 are null, only the transport channel SID 348 is then transmitted. The overall SID can usually be a very low bit-rate description, which is for example as low as 2.4 or 4.25 kbps. The average bit-rate is even more reduced in the inactive phase since most of the time no transmission is done and no data are sent.

In the advantageous embodiment of the invention the transport channel SID 348 has a size of 2.4 kbps and the overall SID including spatial parameters has a size of 4.25 kbps. The computation of the inactive spatial parameters are described in FIG. 4 for DirAC having as input a multi-channel signal like FOA, which could directly derived from a higher order of Ambisonics (HOA), in FIG. 5 for MASA input format. As described earlier, the inactive spatial parameters 318 can be derived in parallel to the active spatial parameters 316, averaging and/or requantizing the already coded active spatial parameters 318. In case of multi-channel signal like FOA as input format 302, a filterbank analysis of the multi-channel signal 302 may be performed before computing the spatial parameters, direction and diffuseness, for each time and frequency tile. The metadata encoders 396, 398 could average the parameters 316, 318 over different frequency bands and/or time slots before applying a quantizer and a coding of the quantized parameters. Further inactive spatial metadata encoder can inherit from some of the quantized parameters derived in the active spatial metadata encoder to use them directly in the inactive spatial parameters or to requantize them. In case of MASA format (e.g. FIG. 5), first the input metadata may be read and provided the metadata encoders 396, 398 at a given time-frequency and bit depth resolution. The metadata encoder(s) 396, 398 will process then further by eventually converting some parameters, adapting their resolution (i.e. lowering the resolution for example averaging them) and requantizing them before coding them by an entropy coding scheme for example.

At the decoder side as depicted e.g. in FIG. 6, the VAD information 221 (e.g. whether the frame is classified as active or inactive) is first recovered, either by detecting the size of the transmitted packet (e.g. frame) or by detecting the non-transmission of a packet. In active frames 346, the decoder runs in the active mode and the transport channel coder payload is decoded as well as the active spatial parameters. The spatial renderer 220 (DirAC synthesis) then upmixes/spatializes the decoded transport channels using the decoded spatial parameters 316, 318 in the output spatial format. In inactive frames, a comfort noise may be generated in the transport channels by the transport channel CNG portion 810 (e.g. in FIG. 10). The CNG is guided the transport channel SID for adjusting usually the energy and the spectral shape (through for example scale factors applied in frequency domain or Linear Predictive Coding Coefficients applied through a time domain synthesis filter). The comfort noise(s) 228*d*, 228*a*, etc. are then rendered/spatialized in the spatial renderer (DirAC synthesis) 740 guided this time by the inactive spatial parameters 318. The output spatial format 202 can be a binaural signal (2 channels), multi-channel for a given loudspeaker layout, or a multichannel signal in Ambisonic format. In an alternative embodiment, the output format can be Metadata assisted spatial audio (MASA), that means that the decoded transport channels or the transport channel comfort noises are directly output along with the active or inactive spatial parameters, respectively, for rendering by an external device.

Encoding and Decoding of the Inactive Spatial Parameters

The inactive spatial parameters 318 can consist of one of multiple directions in frequency bands and associated energy ratios in frequency bands corresponding to the ratio of one directional component over the total energy. In case of one direction, as in an advantageous embodiment, the energy ratio can be replaced by the diffuseness, which is complementary to the ratio of energy and then follow the original DirAC set of parameters. Since the directional component(s) is (are) in general expected to be less relevant than the diffuse part in inactive frames, it can be also transmitted on fewer bits using a coarser quantization scheme such as in active frames and/or by averaging the direction over time or frequency for getting a coarser time and/or frequency resolution. In an advantageous embodiment, the direction may be sent every 20 ms instead of 5 ms for active frames but using the same frequency resolution of 5 non-uniform bands.

In an advantageous embodiment, diffuseness 314*a* may be transmitted with same time/frequency as in active frames but on fewer bits, forcing a minimum quantization index. For example, if diffuseness 314*a* is quantized on 4 bits in active frames, it is then transmitted only on 2 bits, avoiding the transmission of original indices from 0 to 3. The decoded index will be then added with an offset of +4.

It is also possible to completely avoid sending the direction 314*b* or alternatively avoid sending the diffuseness 314*a* and replace it at the decoder by a default or an estimated value, in some examples.

Moreover, one can consider to transmit an inter-channel coherence if input channels correspond to channels positioned the spatial domain. Inter-channel level differences are also an alternative to the directions.

More relevant is to send a surround coherence which is defined as the ratio of diffuse energy which is coherent in the sound field. It can be the exploited at the spatial renderer (DirAC synthesis) for example by redistributing the energy between direct and diffuse signals. The energy of surround coherent components is removed from the diffuse energy to be redistributed to the directional components which will be then panned more uniformly in the space.

Naturally, any combinations of the previously listed parameters could be considered for the inactive spatial parameters. It could be also envisioned for bit saving purposes, to not send any parameters in the inactive phase.

An exemplary pseudo code of the inactive spatial metadata encoder is given below:

```
bistream = inactive_spatial_metadata_encoder (
    azimuth, /* i: azimuth values from active spatial metadata encoder */
    elevation, /* i: elevation values from active spatial metadata encoder */
    diffuseness_index, /* i/o: diffuseness indices from active spatial metadata encoder */
    metadata_sid_bits /* i bits allocated to inactive spatial metadata (spatial SID) */
)
{
    /* Signalling 2D*/
    not_in_2D = 0;
    for ( b = start_band; b < nbands; b++ )
    {
        for ( m = 0; m < nblocks; m++ )
        {
        not_in_2D += elevation[b][m];
        }
    }
    write_next_indice( bistream, (not_in_2D > 0 ), 1 ); /*2D flag*/
    /*Count required bits */
    bits_dir = 0;
    bits_diff = 0;
    for ( b = start_band; b < nbands; b++ )
    {
      diffuseness_index[b] = max( diffuseness_index[b], 4 );
      bits_diff += get_bits_diffuseness(diffuseness_index[b] - 4, DIRAC_DIFFUSE_LEVELS - 4);
      if ( not_in_2D == 0 )
      {
        bits_dir += get_bits_azimuth(diffuseness_index[b]);
      }
      else
      {
        bits_dir += get_bits_spherical(diffuseness_index[b]);
      }
    }
    /* Reduce bit demand by increasing diffuseness index*/
    bits_delta = metadata_sid_bits - 1 - bits_diff - bits_dir;
    while ( ( bits_delta < 0 ) && (not_in_2D > 0 ) )
    {
      for ( b = nbands - 1; b >= start_band && ( bits_delta < 0 ); b-- )
      {
        if ( diffuseness_index[b] < ( DIRAC_DIFFUSE_LEVELS - 1 ) )
        {
          bits_delta += get_bits_spherical(diffuseness_index[b]);
          diffuseness_index[b]++;
          bits_delta -= get_bits_spherical(diffuseness_index[b]);
        }
      }
    }
```

-continued

```
    /*Write diffuseness indices*/
    for ( b = start_band; b < nbands; b++ )
    {
        Write_diffuseness(bitstream, diffuseness_index[b]– 4, DIRAC_DIFFUSE_LEVELS – 4);
    }
    /* Compute and Quantize an average direction per band*/
    for ( b = start_band; b < nbands; b++ )
    {
        set_zero( avg_direction_vector, 3 );
        for ( m = 0; m < nblocks; m++ )
        {
            /*compute the average direction */
            azimuth_elevation_to_direction_vector(azimuth[b][m], elevation[b][m], direction_vector );
            v_add( avg_direction_vector, direction_vector, avg_direction_vector, 3 );
        }
        direction_vector_to_azimuth_elevation( avg_direction_vector, &avg_azimuth[b], &avg_ele-
vation[b] );
        /* Quantize the average direction */
        if ( not_in_2D > 0 )
      {
        Code_and_write_spherical_angles(bitsream, avg_elevation[b], avg_azimuth[b],
get_bits_spherical(diffuseness_index[b]));
      }
      else
      {
        Code_and_write_azimuth (bitsream, avg_azimuth[b],          get_bits_azimuth(dif-
fuseness_index[b]));
      }
  }
    For(i=0; i<delta_bits; i++)
    {
        Write_next_bit ( bitstream, 0); /*fill bit with value 0*/
    }
}
```

An exemplary pseudo code of the inactive spatial metadata decoder is given below:

```
[diffuseness, azimuth, elevation] = inactive_spatial_metadata_decoder(bitstream)
    /* Read 2D signalling*/
    not_in_2D = read_next_bit(bitstream);
    /* Decode diffuseness*/
    for ( b = start_band; b < nbands; b++ )
    {
        diffuseness_index[b] = read_diffuseness_index( bitstream, DIFFUSE_LEVELS – 4 ) + 4;
        diffuseness_avg = diffuseness_reconstructions[diffuseness_index[b]];
                for ( m = 0; m < nblocks; m++ )
            diffuseness[b][m] = diffusenessavg;
    }
    /* Decoder DOAs*/
    if (not_in_2D > 0)
    {
        for ( b = start_band; b < nbands; b++ )
        {
            bits_spherical = get_bits_spherial(diffuseness_index[b]);
                spherical_index = Read_spherical_index( bitstream, bits_spherical);
                azimuth_avg = decode_azimuth(spherical_index, bits_spherical);
                elevation_avg = decode_elevation(spherical_index, bits_spherical);
            for ( m = 0; m < nblocks; m++ )
            {
                elevation[b][m] *= 0.9f;
                elevation[b][m] += 0.1f * elevation_avg;
                azimuth[b][m] *= 0.9f;
                azimuth[b][m] += 0.1f * azimuth_avg;
            }
        }
    }
    else
    {
        for ( b = start_band; b < nbands; b++ )
        {
                bits_azimuth = get_bits_azimuth(diffuseness_index[b]);
                azimuth_index = Read_azimuth_index( bitstream, bits_azimuth);
            azimuth_avg = decode_azimuth(diffuseness_index,_ bits_azimuth);
            for ( m = 0; m < nblocks; m++ )
            {
```

-continued

```
            elevation[b][m] *= 0.9f;
            azimuth[b][m] *= 0.9f;
            azimuth[b][m] += 0.1f * azimuth_avg;
         }
      }
   }
```

Recovering the Spatial Parameter in Case of Non-Transmission at Decoder Side

In case of SID during inactive phase, spatial parameters can be fully or partially decoded and then used for the subsequent DirAC synthesis.

In case of no data transmission or if no spatial parameters 318 are transmitted along with the transport channel said 348, the spatial parameters 219 could need to be restituted. This can be achieved by synthetically generating the missing parameters 219 (e.g. FIGS. 7-10) by considering the past-received parameters (e.g. 316 and 7 or 318). An unstable spatial image can be perceived has unpleasant, especially on background noise considered steady and not rapidly evolving. On the other hand, a strictly constant spatial image may be perceived as unnatural. Different strategies can be applied:

Hold Strategy:

It is generally safe to consider that the spatial image has to be relatively stable over time, which can be translated for the DirAC parameters, i.e. DOA and diffuseness that they do not change much between frames. For this reason, a simple but effective approach is to keep, as recovered spatial parameters 219, the last received spatial parameters 316 and/or 318. It is a very robust approach at least for the diffuseness, which has a long-term characteristic. However for the direction different strategies can be envisioned as listed below.

Extrapolation of the Direction:

Alternatively or in addition, it can be envisioned to estimate the trajectory of sound events in the audio scene and then try to extrapolate the estimated trajectory. It is especially relevant if the sound event is well localized in the space as a point source, which is reflected in the DirAC model by a low diffuseness. The estimated trajectory can be computed from observations of past directions and fitting a curve amongst these points, which can evolve either interpolation or smoothing. A regression analysis can be also employed. The extrapolation of the parameter 219 may then be performed by evaluating the fitted curve beyond the range of observed data (e.g., including the previous parameters 316 and/or 318). However, this approach could result less relevant for inactive frames 348, where the background noise is useless and expected to be largely diffused.

Dithering of the Direction:

When the sound event is more diffuse, which is specially the case for background noise, the directions are less meaningful and can be considered as the realization of a stochastic process. Dithering can then help make more natural and more pleasant the rendered sound field by injecting a random noise to the previous directions before using it for the non-transmitted frames. The injected noise and its variance can be function of the diffuseness. For example, the variances $\sigma_{azi}$ and $\sigma_{ele}$ of the injected noises in the azimuth and elevation can follow a simple model function of diffuseness Y like as follows:

$$\sigma_{azi}=65\Psi^{3.5}+\sigma_{ele}$$

$$\sigma_{ele}=33.25\Psi+1.25$$

Comfort Noise Generation and Spatialization (Decoder side)

Some examples, provided above, are now discussed.

In a first embodiment the Comfort Noise Generator 210 (710) is done in the core decoder as depicted in FIG. 7. The resulting comfort noises are injected in the transport channels and then spatialized in the DirAC synthesis with the help of the transmitted inactive spatial parameters 318 or in case of non-transmission, using the spatial parameters 219 deduced as previously described. The spatialization may then be realized the way as described earlier, e.g. by generating two streams, a directional and a non-directional, which are derived from the decoded transport channels, and in case of inactive frames from the transport channel comfort noises. The two streams are then upmixed and mixed together at block 740 depending on the spatial parameters 318.

Alternatively the comfort noise or a part of it, could be directly generated within the DirAC Synthesis in the filterbank domain. Indeed DirAC may control the coherence of the restituted scene with the help of the transport channels 224, the spatial parameters 318, 316, 319, and some decorrelators (e.g. 730). The decorrelators 730 may reduce the coherence of the synthesized sound field. The spatial image is then perceived with more width, depth, diffusion, reverberation or externalization in case of headphone reproduction. However, decorrelators are often prone to typical audible artefacts, and it is desirable to reduce their use. This can be achieved for example by the so-called co-variance synthesis method [5] by exploiting the already existing incoherent component of the transport channels. However, this approach may have limitations, especially in case of a monophonic transport channel.

In case of comfort noise generated by random noise, it is advantageous to generate for each output channels, or at least a subset of them, a dedicated comfort noise. More specifically, it is advantageous to apply the comfort noise generation not only on the transport channels but also to the intermediate audio channels used in the spatial renderer (DirAC synthesis) 220 (and in the mixing block 740). The decorrelation of the diffuse field will then be directly given by using different noise generators, rather than using the decorrelators 730, which can lower the amount of artefacts but also the overall complexity. Indeed different realizations of a random noise are by definition decorrelated. FIGS. 8 and 9 illustrates two ways of achievement this, by generating the comfort noise completely or partly within the spatial renderer 220. In FIG. 8, the CN is done in frequency domain as described in [5], it can be directly generated with the filterbank domain of the spatial renderer avoiding both the filterbank analysis 720 and the decorrelators 730. Here, K the number of channels for which a comfort noise is generated is the equal or greater than M, the number of transport channels, and lower or equal than N the number of output channels. In the simplest case, K=N.

FIG. 9 illustrates another alternative to include comfort noise generation 810 in the renderer. The comfort noise generation is split between inside (at 710) and outside (at 810) the spatial renderer 220. The comfort noise 228*d* within the renderer 220 is added (at adder 920) to eventual decorrelator output 228*a*. For example, low band can be generate outside in the same domain as in the core coder in order to be able to update easily the necessary memories. On the other hand, the comfort noise generation can be performed directly in the renderer for high frequencies.

Further, the comfort noise generation can be also apply during active frames 346. Instead of switching off completely the comfort noise generation during active frames 346, it can be kept active by reducing its strength. It serves then masking the transition between active and inactive frames, also masking artefacts and imperfections of both the core coder and the parametric spatial audio model. This was proposed in for monophonic speech coding. Same principle can be extend to spatial speech coding. FIG. 10 illustrates an implementation. This time the comfort noise generations in the spatial renderer 220 is switched on both active and inactive phase. In inactive phase 348, it is complementary to the comfort noise generation performed in the transport channels. In the renderer, the comfort noise is done on K channels equal or greater the M transport channels aiming to reduce the use of the decorrelators. The comfort noise generation in the spatial renderer 220 are added to upmixed version 228*f* of the transport channels, which can be achieved by a simple copy of the M channels into the K channels.

ASPECTS

For the encoder:

1. An audio encoder apparatus (300) for encoding a spatial audio format having multiple channels or a one or several audio channels with metadata describing the audio scene, comprising at least one of:
   a. A scene audio analyzer (310) of the spatial audio input signal (302) configured to generate a first set or a first and a second sets of spatial parameters (318, 319) describing the spatial image and downmixed version (326) of the input signal (202) containing one or several transport channels, the number of transport channels being less than the number of input channels
   b. A transport channel encoder device (340) configured to generate encoded data (346) by encoding the downmixed signal (326) containing the transport channels in an active phase (306);
   c. A transport channel silence insertion descriptor (350) to generate a silence insertion description (348) of the background noise of transport channels (328) in an inactive phase (308);
   d. A multiplexer (370) for combining the first set of spatial parameters (318) and the encoded data (344) into a bitstream (304) during active phases (306), and for sending no data or for sending the silence insertion description (348), or combining sending the silence insertion description (348) and the second set of spatial parameters (318) during inactive phases (308).
2. Audio encoder according to 1, wherein the scene audio analyzer (310) follows the Directional Audio Coding (DirAC) principle.
3. Audio encoder according to 1, wherein the scene audio analyzer (310) interprets the input metadata along with one or several transport channels (348).
4. Audio encoder according to 1, wherein the scene audio analyzer (310) derived the one or two sets of parameters (316, 318) from the input metadata and derived the transport channels from one or several input audio channels.
5. Audio encoder according to 1, wherein the spatial parameters are either one or several directions of arrival (DOA(s)) (314*b*), or a diffuseness (314*a*), or one or several coherences.
6. Audio encoder according to 1, wherein the spatial parameters are derived for different frequency sub-bands.
7. Audio encoder according to 1, wherein the transport channel encoder device follows the CELP principle, or is a MDCT-based coding scheme, or a switched combination of the two schemes.
8. Audio encoder according to 1, wherein the active phases (306) and inactive phases (308) are determined by a voice activity detector (320) performed on the transport channels.
9. Audio encoder according to 1, where the first and second sets of spatial parameters (316, 318) differ in the time or frequency resolution, or the quantization resolution, or the nature of the parameters.
10. Audio encoder according to 1, where the spatial audio input format (202) is in Ambisonic format, or B-format, or a multi-channel signal associated to a given loudspeaker setup, or a multi-channel signal derived from a microphone array, or a set of individual audio channels along with metadata, or metadata-assisted spatial audio (MASA).
11. Audio encoder according to 1, where the spatial audio input format consist of more than two audio channels.
12. Audio encoder according to 1, where the number of transport channel(s) is 1, 2 or 4 (other numbers may be chosen).

For the decoder:

1. An audio decoder apparatus (200) for decoding a bitstream (304) so as to produce therefrom an spatial audio output signal (202), the bitstream (304) comprising at least an active phase (306) followed by at least an inactive phase (308), wherein the bitstream has encoded therein at least a silence insertion descriptor frame, SID (348), which describes background noise characteristics of the transport/downmix channels (228) and/or the spatial image information, the audio decoder apparatus (200) comprising at least one of:
   a. a silence insertion descriptor decoder (210) configured to decode the silence SID (348) so as to reconstruct the background noise in the transport/downmix channels (228);
   b. a decoding device (230) configured to reconstruct the transport/downmix channels (226) from the bitstream (304) during the active phase (306);
   c. a spatial rendering device (220) configured to reconstruct (740) the spatial output signal (202) from the decoded transport/downmix channels (224) and the transmitted spatial parameters (316) during the active phase (306), and from the reconstructed background noise in the transport/downmix channels (228) during the inactive phase (308).
2. Audio decoder according to 1 where the spatial parameters (316) transmitted in the active phase consist of a diffuseness, or a direction-of-arrival or a coherence.
3. Audio decoder according to 1 where the spatial parameters (316, 318) are transmitted by frequency sub-bands.

4. Audio decoder according to 1 where the silence insertion description (348) contains spatial parameters (318) additionally to the background noise characteristics of the transport/downmix channels (228).
5. Audio decoder according to 4 where the parameters (318) transmitted in the SID (348) may consist of a diffuseness, or a direction-of-arrival or a coherence.
6. Audio decoder according to 4 where the spatial parameters (318) transmitted in the SID (348) are transmitted by frequency sub-bands.
7. Audio decoder according to 4 where the spatial parameters (316, 318) transmitted or encoded during the active phase (346) and in the SID (348) have either different frequency resolution, or time resolution, or quantization resolution.
8. Audio decoder according to 1 where the spatial renderer (220) may consist of
   a. A decorrelator (730) for getting a decorrelated version (228*b*) of the decoded transport/downmix channel(s) (226) and/or the reconstructed background noise (228)
   b. An upmixer for deriving the output signals from of the decoded transport/downmix channel(s) (226) or the reconstructed background noise (228) and their decorrelated version (228*b*) and from the spatial parameters (348).
9. Audio decoder according to 8 where the upmixer of the spatial renderer includes
   a. At least two noise generators (710, 810) for generating at least two decorrelated background noises (228, 228*a*, 228*d*) with characteristics described in the silence descriptors (448) and/or given by a noise estimation applied in the active phase (346).
10. Audio decoder according to 9 where the generated decorrelated background noise in the upmixer are mixed with decoded transport channels or the reconstructed background noise in the transport channels considering the spatial parameters transmitted in the active phase and/or the spatial parameters included in the SID.
11. Audio decoder according to one of the preceding aspects, wherein the decoding device comprises a speech coder like CELP or a generic audio coder, like TCX or a bandwidth extension module.

FURTHER CHARACTERIZATION OF FIGURES

FIG. 1: DirAC analysis and synthesis from [1]

FIG. 2: Detailed block diagram of DirAC analysis and synthesis in the low bit-rate 3D audio coder FIG. 3: Block diagram of the decoder FIG. 4: Block diagram of the Audio Scene Analyzer in DirAC mode FIG. 5: Block diagram of the Audio Scene Analyzer for MASA input format FIG. 6: Block diagram of the decoder FIG. 7: Block diagram of the spatial renderer (DirAC synthesis) with CNG in the transport channels is outside the renderer FIG. 8: Block diagram of the spatial renderer (DirAC synthesis) with CNG in performed directly in the filterbank domain of the renderer for the K channels, K>=M transport channels.

FIG. 9: Block diagram of the spatial renderer (DirAC synthesis) with CNG in performed in both outside and inside the spatial renderer.

FIG. 10: Block diagram of the spatial renderer (DirAC synthesis) with CNG in performed in both outside and inside the spatial renderer and also switched on for both active and inactive frames.

ADVANTAGES

Embodiments of the present invention allow extending DTX to parametric spatial audio coding in an efficient way. It can restitute with a high perceptual fidelity the background noise even for inactive frames for which the transmission can be interrupted for communication bandwidth saving.

For this, the SID of the transport channels is extended by inactive spatial parameters relevant for describing the spatial image of the background noise. The generated comfort noise is applied in the transport channels before being spatialized by the renderer (DirAC synthesis). Alternatively, for an improvement in quality the CNG can be applied to more channels than the transport channels within the rendering. It allows complexity saving and reducing the annoyance of the decorrelator artefacts.

OTHER ASPECTS

It is to be mentioned here that all alternatives or aspects as discussed before and all aspects as defined by independent aspects in the following aspects can be used individually, i.e., without any other alternative or object than the contemplated alternative, object or independent aspect. However, in other embodiments, two or more of the alternatives or the aspects or the independent aspects can be combined with each other and, in other embodiments, all aspects, or alternatives and all independent aspects can be combined to each other.

An inventively encoded signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent aspects and not by the specific details presented by way of description and explanation of the embodiments herein.

The subsequently defined aspects for the first set of embodiments and the second set of embodiments can be combined so that certain features of one set of embodiments can be included in the other set of embodiments.

The invention claimed is:

1. Apparatus for generating an encoded audio scene from an audio signal comprising a first frame and a second frame, comprising:

a soundfield parameter generator for determining a first soundfield parameter representation for the first frame from the audio signal in the first frame and a second soundfield parameter representation for the second frame from the audio signal in the second frame; and an activity detector for analyzing the audio signal to determine, depending on the audio signal, that the first frame is an active frame and the second frame is an inactive frame, wherein the soundfield parameter generator is configured to determine, from the second frame of the audio signal, individual sound source(s) and to determine, for each sound source, a parametric description for the second frame, wherein the soundfield parameter generator is configured to decompose the second frame into frequency bin(s), each frequency bin representing an individual sound source of the individual sound source(s), and to determine, for each frequency bin, at least one inactive spatial parameter as the second soundfield parameter representation for the second frame, the at least one inactive spatial parameter comprising a direction parameter, a direction of arrival parameter, a diffuseness parameter, or an energy ratio parameter, the apparatus further comprising:

an audio signal encoder for generating an encoded audio signal, the encoded audio signal providing an encoded audio signal for the first frame being the active frame and the parametric description for the second frame being the inactive frame; and an encoded signal former for composing the encoded audio scene by bringing together the first soundfield parameter representation for the first frame, the second soundfield parameter representation for the second frame, the encoded audio signal for the first frame, and the parametric description for the second frame.

2. Apparatus of claim 1, wherein the soundfield parameter generator is configured to determine, from the second frame of the audio signal, a plurality of individual sound sources and to determine, for each sound source, the parametric description for the second frame, each frequency bin representing an individual sound source of the plurality of individual sound sources.

3. Apparatus of claim 1, wherein the soundfield parameter generator is configured to generate the second soundfield parameter representation so that the second soundfield parameter representation comprises a parameter indicating a characteristic of the audio signal with respect to a listener position.

4. Apparatus of claim 1, wherein the first soundfield parameter representation comprises one or more direction parameters indicating a direction of sound with respect to a listener position in the first frame, or one or more diffuseness parameters indicating a portion of a diffuse sound with respect to a direct sound in the first frame, or one or more energy ratio parameters indicating an energy ratio of a direct sound and a diffuse sound in the first frame, or an inter-channel/surround coherence parameter in the first frame.

5. Apparatus of claim 1, wherein the audio signal for the first frame and the second frame comprises an input format comprising a plurality of components representing a soundfield with respect to a listener, wherein the soundfield parameter generator is configured to calculate one or more transport channels for the first frame and the second frame, using a downmix of the plurality of components, and to analyze the input format to determine the first parameter representation related to the one or more transport channels, or wherein the soundfield parameter generator is configured to calculate one or more transport channels, using a downmix of the plurality of components, and wherein the activity detector is configured to analyze the one or more transport channels derived from the audio signal in the second frame.

6. Apparatus of claim 1, wherein the audio signal for the first frame or the second frame comprises an input format having, for each frame of the first and second frames, one or more transport channels and metadata associated with each frame, wherein the soundfield parameter generator is configured to read the metadata from the first frame and the second frame and to use or process the metadata for the first frame as the first soundfield parameter representation and to process the metadata of the second frame to acquire the second soundfield parameter representation, wherein the processing to acquire the second soundfield parameter representation is such that an amount of information units required for the transmission of the metadata for the second frame is reduced with respect to an amount required before the processing.

7. Apparatus of claim 6, wherein the soundfield parameter generator is configured to process the metadata for the second frame to reduce a number of information items in the metadata or to resample the information items in the metadata to a lower resolution, such as a time resolution or a frequency resolution, or to requantize the information units of the metadata for the second frame to a coarser representation with respect to a situation before requantization.

8. Apparatus of claim 1, wherein the audio signal encoder is configured to determine a silence information description for the inactive frame as the parametric description, wherein the silence information description comprises an amplitude-related information, such as an energy, a power or a loudness for the second frame, and a shaping information, such as a spectral shaping information, or an amplitude-related information for the second frame, such as an energy, a power, or a loudness, and linear prediction coding, LPC, parameters for the second frame, or scale parameters for the second frame with a varying associated frequency resolution so that different scale parameters refer to frequency bands with different widths.

9. Apparatus of claim 1, wherein the audio signal encoder is configured to encode, for the first frame, the audio signal using a time domain or frequency domain encoding mode, the encoded audio signal comprising encoded time domain samples, encoded spectral domain samples, encoded LPC domain samples and side information acquired from components of the audio signal or acquired from one or more transport channels derived from the components of the audio signal by a downmixing operation.

10. Apparatus of claim 1, wherein the audio signal comprises an input format being a first order Ambisonics format, a higher order Ambisonics format, a multi-channel format associated with a given loudspeaker setup, such as 5.1 or 7.1 or 7.1+4, or one or more audio channels representing one or several different audio objects localized in a space as indicated by information comprised by associated metadata, or an input format being a metadata associated spatial audio representation, wherein the soundfield parameter generator is configured for determining the first soundfield parameter representation and the second soundfield representation so that the parameters represent a soundfield with respect to a defined listener position.

11. Apparatus of claim 1, wherein the audio signal comprises an input format being a first order Ambisonics format, a higher order Ambisonics format, a multi-channel format associated with a given loudspeaker setup, such as 5.1 or 7.1 or 7.1+4, or one or more audio channels representing one or several different audio objects localized in a space as indicated by information comprised by associated metadata, or an input format being a metadata associated spatial audio representation, wherein the audio signal comprises a microphone signal as picked up by real microphone or a virtual microphone or a synthetically created microphone signal e.g. being in a first order Ambisonics format, or a higher order Ambisonics format.

12. Apparatus of claim 1, wherein the activity detector is configured for detecting an inactivity phase over the second frame and one or more frames following the second frame, and wherein the activity detector is configured for determining an inactive phase comprising the second frame and eight frames following the second frame, and wherein the audio signal encoder is configured for generating a parametric description for an inactive frame only at every eighth frame, and wherein the soundfield parameter generator is configured for generating a soundfield parameter representation for each eighth inactive frame.

13. Apparatus of claim 1, wherein the activity detector is configured for detecting an inactivity phase over the second frame and one or more frames following the second frame, and wherein the soundfield parameter generator is configured for generating a soundfield parameter representation for each inactive frame even when the audio signal encoder does not generate a parametric description for an inactive frame.

14. Apparatus of claim 1, wherein the soundfield parameter generator is configured for determining a parameter representation with a higher frame rate than the audio signal encoder generates the parametric description for one or more inactive frames.

15. Apparatus of claim 1, wherein the soundfield parameter generator is configured for determining the second soundfield parameter representation for the second frame using spatial parameters for one or more directions in frequency bands and associated energy ratios in frequency bands corresponding to a ratio of one directional component over a total energy.

16. Apparatus of claim 1, wherein the soundfield parameter generator is configured for determining the second soundfield parameter representation for the second frame to determine a diffuseness parameter indicating a ratio of diffuse sound or direct sound.

17. Apparatus of claim 1, wherein the soundfield parameter generator is configured for determining the second soundfield parameter representation for the second frame to determine a direction information using a coarser quantization scheme compared to a quantization in the first frame.

18. Apparatus of claim 1, wherein the soundfield parameter generator is configured for determining the second soundfield parameter representation for the second frame using an averaging of a direction over time or frequency for acquiring a coarser time or frequency resolution.

19. Apparatus of claim 1, wherein the soundfield parameter generator is configured for determining the second soundfield parameter representation for the second frame to determine a soundfield parameter representation for one or more inactive frames with the same frequency resolution as in the first soundfield parameter representation for an active frame, and with a time occurrence that is lower than the time occurrence for active frames with respect to a direction information in the soundfield parameter representation for the inactive frame.

20. Apparatus of claim 1, wherein the soundfield parameter generator is configured for determining the second soundfield parameter representation for the second frame to determine the second soundfield parameter representation comprising a diffuseness parameter, where the diffuseness parameter is transmitted with the same time or frequency resolution as for active frames, but with a coarser quantization.

21. Apparatus of claim 1, wherein the soundfield parameter generator is configured for determining the second soundfield parameter representation for the second frame to quantize a diffuseness parameter for the second soundfield representation with a first number of bits, and wherein only a second number of bits of each quantization index is transmitted, the second number of bits being smaller than the first number of bits.

22. Apparatus of claim 1, wherein the soundfield parameter generator is configured for determining the second soundfield parameter representation for the second frame to determine, for the second soundfield parameter representation, an interchannel coherence if the audio signal comprises input channels corresponding to channels positioned in a spatial domain or inter-channel level differences if the audio signal comprises input channels corresponding to channels positioned in the spatial domain.

23. Apparatus of claim 1, wherein the soundfield parameter generator is configured for determining the second soundfield parameter representation for the second frame to determine a surround coherence being defined as a ratio of diffuse energy being coherent in a soundfield represented by the audio signal.

24. Method of generating an encoded audio scene from an audio signal comprising a first frame and a second frame, comprising:

determining a first soundfield parameter representation for the first frame from the audio signal in the first frame and a second soundfield parameter representation for the second frame from the audio signal in the second frame; and analyzing the audio signal to determine, depending on the audio signal, that the first frame is an active frame and the second frame is an inactive frame, wherein determining the first soundfield parameter representation comprises determining, from the second frame of the audio signal, for each sound source, a parametric description for the second frame, wherein determining the first soundfield parameter representation comprises decomposing the second frame into frequency bin(s), each frequency bin representing an individual sound source, and determining, for each frequency bin, at least one inactive spatial parameter as the second soundfield parameter representation for the second frame, the at least one inactive spatial parameter comprising a direction parameter, a direction of arrival parameter, a diffuseness parameter, or an energy ratio parameter, the method further comprising:

generating an encoded audio signal, the encoded audio signal providing an encoded audio signal for the first frame being the active frame and the parametric description for the second frame being the inactive frame; and composing the encoded audio scene by bringing together the first soundfield parameter representation for the first frame, the second soundfield parameter representation for the second frame, the encoded audio signal for the first frame, and the parametric description for the second frame.

25. Method of claim 24, from the second frame of the audio signal, a plurality of individual sound sources and determining, for each sound source, a parametric description for the second frame, wherein determining the first soundfield parameter representation comprises decomposing the second frame into a plurality of frequency bins, each frequency bin representing an individual sound source.

26. A non-transitory digital storage medium having a computer program stored thereon to perform the method of generating an encoded audio scene from an audio signal comprising a first frame and a second frame, comprising:

determining a first soundfield parameter representation for the first frame from the audio signal in the first frame and a second soundfield parameter representation for the second frame from the audio signal in the second frame; and analyzing the audio signal to determine, depending on the audio signal, that the first frame is an active frame and the second frame is an inactive frame, wherein determining the first soundfield parameter representation comprises determining, from the second frame of the audio signal, for each sound source, a parametric description for the second frame, wherein determining the first soundfield parameter representation comprises decomposing the second frame into frequency bin(s), each frequency bin representing an individual sound source, and determining, for each frequency bin, at least one inactive spatial parameter as the second soundfield parameter representation for the second frame, the at least one inactive spatial parameter comprising a direction parameter, a direction of arrival parameter, a diffuseness parameter, or an energy ratio parameter, the method further comprising:

generating an encoded audio signal, the encoded audio signal providing an encoded audio signal for the first frame being the active frame and the parametric description for the second frame being the inactive frame; and composing the encoded audio scene by bringing together the first soundfield parameter representation for the first frame, the second soundfield parameter representation for the second frame, the encoded audio signal for the first frame, and the parametric description for the second frame, when said computer program is run by a computer.

* * * * *